(12) United States Patent
Wu et al.

(10) Patent No.: US 10,595,239 B2
(45) Date of Patent: Mar. 17, 2020

(54) DATA TRANSMISSION METHOD AND DEVICE

(71) Applicant: ZTE Corporation, Shenzhen (CN)

(72) Inventors: Yunlu Wu, Shenzhen (CN); Yin Gao, Shenzhen (CN)

(73) Assignee: ZTE Corporation, Shenzhen, Guangdon (KR)

( * ) Notice: Subject to any disclaimer, the term of this patent is extended or adjusted under 35 U.S.C. 154(b) by 0 days.

(21) Appl. No.: 15/563,605

(22) PCT Filed: Sep. 9, 2015

(86) PCT No.: PCT/CN2015/089280
§ 371 (c)(1),
(2) Date: Nov. 17, 2017

(87) PCT Pub. No.: WO2016/161759
PCT Pub. Date: Oct. 13, 2016

(65) Prior Publication Data
US 2018/0115926 A1 Apr. 26, 2018

(30) Foreign Application Priority Data
Apr. 9, 2015 (CN) .......................... 2015 1 0167188

(51) Int. Cl.
H04W 36/00 (2009.01)
H04W 36/08 (2009.01)
(Continued)

(52) U.S. Cl.
CPC ....... H04W 36/0027 (2013.01); H04W 36/00 (2013.01); H04W 36/08 (2013.01);
(Continued)

(58) Field of Classification Search
CPC . H04W 36/00; H04W 36/0027; H04W 36/08; H04W 36/165; H04W 36/26; H04W 92/20
See application file for complete search history.

(56) References Cited

U.S. PATENT DOCUMENTS

2015/0208283 A1 7/2015 Yang et al.
2018/0014237 A1* 1/2018 Xu .................. H04W 36/08

FOREIGN PATENT DOCUMENTS

CN 102833802 A 12/2012
CN 104378793 A 2/2015

OTHER PUBLICATIONS

International Search Report in international application No. PCT/CN2015/089280, dated Dec. 28, 2015.
(Continued)

Primary Examiner — Kan Yuen
(74) Attorney, Agent, or Firm — Knobbe, Martens, Olson & Bear

(57) ABSTRACT

Provided in the present invention are a data transmission method and device. In an embodiment of the present invention, in a condition in which a first node acquires whether an X2 interface is present between the first node and a second node, the first node directly transmits a forwarding address thereof to the second node, to address a problem in the related art regarding how to optimize data forwarding in a scenario of double connection switching, thereby improving flexibility and applicability of the data forwarding.

9 Claims, 24 Drawing Sheets

(51) Int. Cl.
H04W 36/16 (2009.01)
H04W 36/26 (2009.01)
H04W 92/20 (2009.01)

(52) U.S. Cl.
CPC ......... *H04W 36/165* (2013.01); *H04W 36/26* (2013.01); *H04W 92/20* (2013.01)

(56) References Cited

OTHER PUBLICATIONS

English Translation of the Written Opinion of the International Search Authority in international application No. PCT/CN2015/089280, dated Dec. 28, 2015.
Samsung, "Handover Enhancement R3-150134", 3GPP TSG-RAN WG3 #87, vol./, No./, Feb. 13, 2015 (Feb. 13, 2015), chapter 2.1, section of "Solution-2".
Samsung, "Data Forwarding Enhancement R3-150130", 3GPP TSG-RAN WG3 #87, vol./, No./, Feb. 13, 2015 (Feb. 13, 2015), chapter 2.
Ericsson, "Analysis of Handover with SeNB Addition R3-150330", 3GPP TSG-RAN WG3 #87, vol./, No./, Feb. 13, 2015 (Feb. 13, 2015), the whole document.
Supplementary European Search Report in European application No. 15888312.4, dated Mar. 22, 2018.
"3rd Generation Partnership Project; Technical Specification Group Radio Access Network; Evolved Universal Terrestrial Radio Access (E-UTRA) and Evolved Universal Terrestrial Radio Access Network (E-UTRAN); overall Description; Stage 2 (Release 12)", 3GPP Draft; 36300-050, 3rd Generation Partnership Project (3GPP), Mobile Competence Centre; 650, Route Des Lucioles; F-06921 Sophia-Antipolis Cedex; Fance, Mar. 24, 2015 (Mar. 24, 2015).
"LTE; General Packet Radio Service (GPRS) enhancements for Evolved Universal Terrestrial Radio Access Network (E-UTRAN) access (3GPP TS 23.401 version 12.8.0 Release 12) ", Technical Specification, European Telecommunications Standards Institute (ETSI), 650, Route Des Lucioles; F-06921 Sophia-Antipolis ; France, vol. 3GPP SA 2, No. V12.8.0, Apr. 1, 2015 (Apr. 1, 2015).

* cited by examiner

In a condition that a first node acquires whether an X2 interface is present between the first node and a second node, the first node directly transmits a forwarding address thereof to the second node ⟵ S802

FIG. 8

Transmission module 10

FIG. 24

Notification module 20

Receiving module 30

Transmission module 40

FIG. 25

Notification module 50

Receiving module 60

Transmission module 70

FIG. 26

DATA TRANSMISSION METHOD AND DEVICE

TECHNICAL FIELD

The disclosure relates to the field of communications, and in particular to a data transmission method and device.

BACKGROUND

Along with the rapid development of a wireless multimedia service, since there is an increasingly demand of people for high data rate and user experience, a higher requirement for system capacity and coverage of the conventional Long Term Evolution (LTE) is pushed forward. In the conventional LTE cellular network, a macro eNB provides an access service for User Equipment (UE) as a unique network element at an access side. In order to meet the demand of the user on the higher data rate and improve the spectral efficiency of the cellular network, a great number of Low Power Nodes (LPNs) are deployed by the operator in the LTE cellular network to take as a supplement of the macro eNB and provide the access service for the UE. The LPN has the characteristics of low cost, low power, convenience in deployment and the like and generally may include two deployment scenarios, namely hotspot deployment and enhanced coverage. Through the LPN, the data rate of a high-rate data service in an indoor or outdoor hotspot area can be effectively improved and the edge coverage in a remote area or cell is improved. Usually, the LPN also can be called as a small eNB and may include but not limited to: a Home eNB (HeNB), a pico eNB, a Remote Radio Unit/Head (RRU/RRH) and a Relay Node (RN). However, due to a fact that the coverage range of a small cell under the small eNB is relatively small, the probability of handover failure when a medium-high speed mobile UE passes through the small eNB is increased and thus the service continuity of the UE is affected. To improve the mobility performance of the UE after being introduced to the small cell, there pushes forward in the industry that the basic coverage is guaranteed by a certain eNB (for example: the macro eNB), the UE always keeps a Radio Recourse Control (RRC) connection with the eNB and the small cell is only taken as a Transmission Point (TP) so as to provide the high data rate and meet the power-saving requirement of the user. FIG. 1 is a schematic diagram of a dual connectivity architecture according to a related art. As shown in FIG. 1, under such architecture, the UE at least keeps the connection with two eNBs and uses wireless resources under two eNBs, such that the cross-node wireless resource aggregation may be implemented. The architecture here is often called as the dual connectivity architecture. One having certain management control ability in the two eNBs connected with the UE is generally called as a Master eNB (MeNB) and the other is called as a Secondary eNB (SeNB).

For each UE, on a control plane, the MeNB may be connected to a Mobility Management Entity (MME) by an S1-MME and may be connected to the SeNB by an X2-C. On a user plane, for a Master Clock Generator (MCG) bearer, the MeNB may be connected to a Serving Gateway (S-GW) by an S1-U, whereas the SeNB does not participate in data transmission on the user plane. For a split bearer, the MeNB may be connected to the S-GW by the S1-U, whereas the MeNB may be connected to the SeNB by the X2-U. For a SCG bearer, the SeNB may be connected to the S-GW by the S1-U, whereas the MeNB does not participate in the data transmission on the user plane.

FIG. 2 is a schematic diagram of a data protocol stack for an LTE user plane according to a related art. As shown in FIG. 2, downlink data received from a core network via a General Packet Radio Service (GPRS) Tunneling Protocol for the User Plane (GTP-U) are unpacked and then are processed through a Packet Data Convergence Protocol (PDCP) sublayer, a Radio Link Control (RLC) protocol sublayer, a Medium Access Control (MAC) protocol sublayer and a Physical Layer (PHY), and are finally transmitted to the UE. The transmission of the uplink data is the other way around with that of the downlink data. When the dual connectivity in Release 12 is discussed in a 3rd Generation Partnership Project (3GPP), two shunting manners for the user plane were mentioned.

Shunting manner 1: FIG. 3 is a schematic diagram of a shunting manner for a 1A user plane according to the related art. As shown in FIG. 3, bearer user planes of the UE on the MeNB and the SeNB are directly connected to the S-GW.

Shunting manner 2: FIG. 4 is a schematic diagram of a shunting manner for a 3C user plane according to the related art. As shown in FIG. 4, the MeNB may be taken as a shunting anchor point, and data are shunted at the PDCP and RLC layers and are respectively transmitted to the MeNB and the SeNB to be further transferred.

When the dual connectivity in the Release 12 is discussed in the 3GPP, a scenario of changing the SeNB is mentioned, that is, the UE is in dual connectivity with the MeNB and a Source SeNB (S-SeNB) before the handover and is in connection with the MeNB and a Target SeNB (T-SeNB) after the handover. Moreover, a scenario of changing the MeNB to the eNB is also mentioned, that is, the UE is in dual connectivity with the Source MeNB (S-MeNB) and the S-SeNB before the handover and is in single connection with the T-eNB after the handover. At present, when the dual connectivity enhancement in Release 13 is discussed in the 3GPP, a scenario of a handover between MeNBs (inter-MeNB handover) with the SeNB unchanged are being mentioned, that is, the UE is in dual connectivity with the S-MeNB and the SeNB before the handover and is in dual connectivity with the T-MeNB and the SeNB after the handover. A scenario of adding the SeNB after the handover are being mentioned, that is, the UE is in single connection with the eNB before the handover and is in dual connectivity with the T-SeNB and the T-MeNB after handover. Additionally, inter-MeNB handover together with the inter-SeNB handover is also being discussed, that is, the UE is in dual connectivity with the S-MeNB and the S-SeNB before the handover and is in dual connectivity with the T-MeNB and T-SeNB after the handover.

FIG. 5 is a signaling flowchart showing a process of an inter-MeNB handover with an SeNB unchanged according to the related art. As shown in FIG. 5, the signaling flowchart may include the following steps.

In step 1, the S-MeNB sends a handover request to the T-MeNB.

In step 2, the T-MeNB responds to the handover request and sends an SeNB modification request to the SeNB.

In step 3, the SeNB returns an SeNB modification request confirmation to the T-MeNB.

In step 4, the T-MeNB returns a handover request confirmation to the S-MeNB.

In step 5, the S-MeNB sends an SeNB release request to the SeNB.

In step 6, the S-MeNB sends an RRC connection reconfiguration to the UE.

In step 7, the UE enters a random access process with the T-MeNB.

In step 8, the UE sends an RRC connection reconfiguration completion to the T-MeNB.

In step 9, the UE enter a random access process with the SeNB.

In step 10, the T-MeNB sends an SeNB reconfiguration completion to the SeNB.

In step 11, the S-MeNB sends SN state transmission to the T-MeNB.

In step 12, Data forwarding is performed between the S-GW and the S-MeNB as well as between the S-MeNB and the T-MeNB.

In step 13, the T-MeNB sends a path conversion request to the MME.

In step 14, bearer modification is performed between the S-GW and the MME.

In step 15a, a new path is established between the S-GW and the T-MeNB.

In step 15b, a new path for the SCG bearer is established between the S-GW and the SeNB.

In step 16, the MME returns a path conversion request confirmation to the T-MeNB.

In step 17, the T-MeNB sends UE context release to the S-MeNB.

In step 18, the S-MeNB sends the UE context release to the SeNB.

During inter-MeNB handover with the SeNB unchanged, the data forwarding of the MCG bearer is performed from the S-MeNB to the T-MeNB (i.e., S-MeNB→T-MeNB). In the SCG bearer, for adding or modifying bearer, the data forwarding is at first performed from the SeNB to the S-MeNB, then is performed from the S-MeNB to the T-MeNB and finally is performed from the T-MeNB to the SeNB in sequence (i.e., SeNB→S-MeNB→T-MeNB-→SeNB), and for deleting bearer, the data forwarding is at first performed from the SeNB to the S-MeNB and then is performed from the S-MeNB to the T-MeNB in sequence (i.e., SeNB→S-MeNB→T-MeNB). In the split bearer, for adding or modifying bearer, the data forwarding is at first performed from the SeNB to the S-MeNB and then is performed from the S-MeNB to the T-MeNB in sequence (i.e., SeNB→S-MeNB→T-MeNB), and thereafter the data are transmitted from the T-MeNB to the SeNB; and for deleting bearer, the data forwarding is at first performed from the SeNB to the S-MeNB and then is performed from the S-MeNB to the T-MeNB in sequence (i.e., SeNB→S-MeNB→T-MeNB). Considering that the bearer type is changed during inter-MeNB handover with the SeNB unchanged, when the bearer type is changed from the SCG into the MCG, the data forwarding is at at first performed from the SeNB to the MeNB and then is performed from the S-MeNB to the T-MeNB in sequence (i.e., SeNB→S-MeNB→T-MeNB). When the bearer type is changed from the MCG into the SCG, the data forwarding is first preformed from the S-MeNB to the T-MeNB and then is performed from the T-MeNB to the SeNB in sequence (i.e., S-MeNB→T-MeNB→eNB). When the bearer type is changed from the split bearer into the MCG bearer, the data forwarding is first performed from the SeNB to the S-MeNB and then is performed from the S-MeNB to the T-MeNB (i.e., SeNB→S-MeNB→T-MeNB). When the bearer type is changed from the MCG bearer into the split bearer, the data forwarding is at first performed from the S-MeNB to the T-MeNB (i.e., S-MeNB→T-MeNB), and thereafter the data are transmitted to the SeNB from the T-MeNB.

During inter-MeNB handover with the SeNB unchanged, in the SCG bearer, for deleting hearer, the data forwarding can be optimized to be performed from SeNB to the T-MeNB (i.e., SeNB→T-MeNB). When the bearer type is changed from the SCG into the MCG during inter-MeNB handover with the SeNB unchanged, the data forwarding may be optimized to be performed from the SeNB to the T-MeNB (i.e., SeNB→T-MeNB). In addition, when the bearer type is changed from the MCG into the SCG during inter-MeNB handover with the SeNB unchanged, the data forwarding may be optimized to be performed from the S-MeNB to the SeNB (i.e., S-MeNB→SeNB).

FIG. 6 is a signaling flowchart showing that an SeNB is added after handover according to the related art. As shown in FIG. 6, the signaling flowchart may include the following steps.

In step 1, the eNB sends a handover request to the T-MeNB.

In step 2, the T-MeNB responds to the handover request and sends an SeNB adding request to the T-SeNB.

In step 3, the T-SeNB returns an SeNB adding request confirmation to the T-MeNB.

In step 4, the T-MeNB returns a handover request confirmation to the eNB.

In step 5, the eNB sends an RRC connection reconfiguration to the UE.

In step 6, the UE enters a random access process with the T-MeNB.

In step 7, the UE sends an RRC connection reconfiguration completion to the T-MeNB.

In step 8, the UE enter a random access process with the T-SeNB.

In step 9, the T-MeNB sends an SeNB reconfiguration completion to the T-SeNB.

In step 10, the eNB sends SN state transmission to the T-MeNB.

In step 11, data forwarding is performed between the S-GW and the eNB as well as between the eNB and the T-MeNB.

In step 12, the T-MeNB sends a path conversion request to the MME.

In step 13, bearer modification is performed between the S-GW and the MME.

In step 14a, a new path is established between the S-GW and the T-MeNB.

In step 14b, a new path for the SCG bearer is established between the S-GW and the T-SeNB.

In step 15, the MME returns a path conversion request confirmation to the T-MeNB.

In step 16, the T-MeNB sends UE context release to the eNB.

In the process of adding the SeNB after the handover, the data forwarding of the MCG bearer is performed from the eNB to the T-MeNB (i.e., eNB→T-MeNB). The data forwarding of the SCG bearer is at first performed from the eNB to the T-MeNB and then performed from the T-MeNB to the T-SeNB (i.e., eNB-→T-MeNB→T-SeNB). The data forwarding of the split bearer is at first performed from the eNB to the T-MeNB and thereafter the data are transmitted from the T-MeNB to the T-SeNB. Considering that the bearer type is changed in the process of adding the SeNB after the handover, when the bearer type is changed from the MCG bearer into the SCG bearer, the data forwarding is at first performed from the eNB to the T-MeNB and then performed from the T-MeNB to the T-SeNB in sequence (i.e., eNB→T-MeNB→T-SeNB). When the bearer type is changed from the MCG bearer into the split bearer, the data forwarding is at first performed from the eNB to the T-MeNB (i.e., eNB→T-MeNB) and thereafter the data are transmitted from the T-MeNB to the T-SeNB.

In the process of adding the SeNB after the handover, for the SCG bearer, the data forwarding may be optimized to be performed from the eNB to the T-SeNB (i.e., eNB→T-SeNB). In the process of adding the SeNB after the handover, when the bearer type is changed from the MCG bearer into the SCG bearer, the data forwarding may be optimized to be performed from the eNB to the T-SeNB (i.e., eNB→T-SeNB).

FIG. 7 is a signaling flowchart showing a process during the inter-MeNB inter-handover together with the SeNB handover according to the related art. As shown in FIG. 7, the signaling flowchart may include the following steps.

In step 1, the S-MeNB sends a handover request to the T-MeNB.

In step 2, the T-MeNB responds to the handover request and sends an SeNB adding request to the T-SeNB.

In step 3, the T-SeNB returns an SeNB adding request confirmation to the T-MeNB.

In step 4, the T-MeNB returns a handover request confirmation to the S-MeNB.

In step 5, the S-MeNB sends an RRC connection reconfiguration to the UE.

In step 6, the UE enters a random access process with the T-MeNB.

In step 7, the UE sends an RRC connection reconfiguration completion to the T-MeNB.

In step 8, the T-MeNB sends an SeNB reconfiguration completion to the T-SeNB.

In the step 9, the UE enter a random access process with the T-SeNB.

In step 10, the S-MeNB sends an SeNB release request to the S-SeNB.

In step 11a, the S-SeNB sends SN state transmission to the S-MeNB.

In step 11b, the S-MeNB sends SN state transmission to the T-MeNB.

In step 11c, the T-MeNB sends SN state transmission to the T-SeNB.

In step 12, data forwarding is performed between the S-GW and the S-SeNB, between the S-SeNB and the S-MeNB, between the S-MeNB and the T-MeNB, as well as between the T-MeNB and the T-SeNB In step 13, the T-MeNB sends a path conversion request to the MME.

In step 14, bearer modification is performed between the S-GW and the MME.

In step 15, the marking and the grouping are finished.

In step 16, a new path is established between the S-GW and the T-MeNB.

In step 17, the MME returns a path conversion request confirmation to the T-MeNB.

In step 18, the T-MeNB sends UE context release to the S-MeNB.

In step 19, the S-MeNB sends UE context release to the S-SeNB.

During inter-MeNB handover together with inter-SeNB handover, the data forwarding of the MCG bearer is performed from the S-MeNB to the T-MeNB (i.e., S-MeNB→T-MeNB). The data forwarding of the SCG bearer is at first performed from the S-SeNB to the S-MeNB, then is performed from the S-MeNB to the T-MeNB and then is performed from the T-MeNB to the T-SeNB in sequence S-SeNB→S-MeNB→T-MeNB→T-SeNB). The data forwarding of the split bearer is at first performed from the S-SeNB to the S-MeNB and then is performed from the S-MeNB to the T-MeNB (i.e., S-SeNB→S-MeNB→T-MeNB), and thereafter the data are transmitted from the T-MeNB to the T-SeNB. Considering that the bearer type is changed during inter-MeNB handover together with inter-SeNB handover, when the bearer type is changed from the MCG bearer into the SCG bearer, the data forwarding is at first performed from the S-MeNB to the T-MeNB and then performed from then performed from the T-MeNB to the T-SeNB in sequence (i.e., S-MeNB→T-MeNB→T-SeNB). When the bearer type is changed from the SCG bearer into the MCG bearer, data forwarding is at first performed from the S-SeNB to the S-MeNB and then performed from the S-MeNB to the T-MeNB in sequence (i.e., S-SeNB→S-MeNB→T-MeNB). When the bearer type is changed from the MCG bearer into the split bearer, data forwarding is at first performed from the S-MeNB to the T-MeNB (i.e., S-MeNB→T-MeNB) and thereafter the data are transmitted from the T-MeNB to the T-SeNB. When the bearer type is changed from the split bearer into the MCG bearer, data forwarding is at first performed from the S-SeNB to the S-MeNB and then performed from the S-MeNB to the T-MeNB (i.e., S-SeNB→S-MeNB→T-MeNB), and thereafter the data are transmitted from the T-MeNB to the T-SeNB.

During inter-MeNB handover together with inter-SeNB handover, for the SCG bearer, the data forwarding may be optimized to be performed from the S-SeNB to the T-SeNB (i.e., S-SeNB→T-SeNB), or the data forwarding may be optimized to be at first performed from the S-SeNB to the S-MeNB and then performed from the S-MeNB to the T-SeNB (i.e., S-SeNB→S-MeNB→T-SeNB), or the data forwarding may be optimized to be at first performed from the S-SeNB to the T-MeNB and then performed from the T-MeNB to the T-SeNB (i.e., S-SeNB→T-MeNB→T-SeNB). During inter-MeNB handover together with inter-SeNB handover, when the bearer type is changed from the MCG bearer into the SCG bearer, the data forwarding may be optimized to be performed from to be performed from the S-MeNB to the T-SeNB (i.e., S-MeNB→T-SeNB). When the bearer type is changed from the SCG bearer into the MCG bearer, the data forwarding may be optimized to be performed from the S-SeNB to the T-MeNB (i.e., S-SeNB→T-MeNB).

SUMMARY

The embodiments of the disclosure provides a data transmission method and device, so as to at least address a problem in the related art regarding how to optimize data forwarding in a scenario of dual connectivity handover.

According to one aspect of the embodiments of the disclosure, a data transmission method is provided.

According to the embodiments of the disclosure, the data transmission method includes: in a condition that a first node acquires whether an X2 interface exists between the first node and a second node, the first node directly transmits a forwarding address of the first node to the second node.

Preferably, the first node transmits the forwarding address of the first node to the second node using one of the following manners: the first node transmits the forwarding address of the first node to the second node in an SeNB modification request message; the first node transmits the forwarding address of the first node to the second node in an SeNB adding message; the first node transmits the forwarding address of the first node to the second node in an SeNB reconfiguration completion message; the first node transmits the forwarding address of the first node to the second node in a pre-defined new message.

Preferably, after the first node transmits the forwarding address of the first node to the second node, the method further includes: in a condition that the second node acquires the forwarding address of the first node, data forwarding is performed directly from the second node to the first node.

Preferably, the first node is a T-MeNB during inter-MeNB handover with the SeNB unchanged; the second node is the SeNB during inter-MeNB handover with the SeNB unchanged.

Preferably, the forwarding address includes: GPRS tunneling protocol information forwarded by uplink data and GPRS tunneling protocol information forwarded by downlink data; the GPRS tunneling protocol information includes: a transmission layer address and a GPRS Tunnel Endpoint Identifier (TEID).

According to another aspect of the embodiments of the disclosure, a data transmission method is provided.

According to the embodiments of the disclosure, the data transmission method includes: in a condition that a third node is required to acquire whether an X2 interface exists between a first node and a second node, the third node notifies information of the first node to the second node, such that the second node determines whether the X2 interface exists between the second node and the first node; or the third node notifies information of the second node to the first node, such that the first node determines whether the X2 interface exists between the first node and the second node; the third node receives indication information from the second node or the first node, wherein the indication information is used to indicate that the X2 interface exists between the second node and the first node or the indication information is used to indicate a direct-forwarding path is available; and the third node transmits a forwarding address of the second node to the first node, or the third node transmits a forwarding address of the first node to the second node.

Preferably, the third node notifies the information of the first node to the second node includes: the third node notifies the information of the first node to the second node in an X2 handover request message. That the third node receives the indication information from the second node includes: the third node receives an X2 handover request confirmation message from the second node, wherein the X2 handover request confirmation message carries the indication information. That the third node transmits the forwarding address of the second node to the first node includes: the third node transmits the forwarding address of the second node to the first node in an SeNB release request message.

Preferably, after the third node transmits the forwarding address of the second node to the first node, the method further includes: after the first node acquires the forwarding address of the second node, data forwarding is performed directly from the first node to the second node.

Preferably, the operation that the third node notifies the information of the second node to the first node includes: the third node notifies the information of the second node to the first node in a newly defined message or an existing dual connectivity message. The operation that the third node receives the indication information from the first node includes: the third node receives a confirmation message of the newly defined message or a confirmation message of the dual connectivity message from the first node, wherein the confirmation message of the newly defined message or the confirmation message of the dual connectivity message carries the indication information. The operation that the third node transmits the forwarding address of the second node to the first node includes: the third node transmits the forwarding address of the second node to the first node in an SeNB release request message.

Preferably, after the third node transmits the forwarding address of the second node to the first node, the method further includes: after the first node acquires the forwarding address of the second node, data forwarding is performed directly from the first node to the second node.

Preferably, that the third node notifies the information of the second node to the first node includes: the third node notifies the information of the second node to the first node in an SeNB modification request message or an SeNB adding request message or a newly defined message. That the third node receives the indication information from the first node includes: the third node receives an SeNB modification request confirmation information or an SeNB adding request confirmation message or a newly defined confirmation message from the first node, wherein the SeNB modification request confirmation information or the SeNB adding request confirmation message or the newly defined confirmation message carries the indication information. That the third node transmits the forwarding address of the first node to the second node includes: the third node transmits the forwarding address of the first node to the second node in an X2 handover request confirmation message.

Preferably, after the third node transmits the forwarding address of the first node to the second node, the method further includes: after the second node acquires the forwarding address of the first node, data forwarding is performed directly from the second node to the first node.

Preferably, that the third node notifies the information of the first node to the second node includes: the third node notifies the information of the first node to the second node in a newly defined message or an existing X2 message. That the third node receives the indication information from the second node includes: the third node receives an X2 handover request message from the second node, wherein the X2 handover request message carries the indication information. That the third node transmits the forwarding address of the first node to the second node includes: the third node transmits the forwarding address of the first node to the second node in an X2 handover request confirmation message.

Preferably, after the third node transmits the forwarding address of the first node to the second node, the method further includes: after the second node acquires the forwarding address of the first node, data forwarding is performed directly from the second node to the first node.

Preferably, the operation that the third node notifies the information of the second node to the first node includes: the third node notifies the information of the second node to the first node in an SeNB adding request message. The operation that the third node receives the indication information from the first node includes: the third node receives an SeNB adding request confirmation message from the first node, wherein the SeNB adding request confirmation message carries the indication information. The operation that third node transmits the forwarding address of the first node to the second node includes: the third node transmits the forwarding address of the first node to the second node in an X2 handover request confirmation message.

Preferably, after the third node transmits the forwarding address of the first node to the second node, the method further includes: after the second node acquires the forwarding address of the first node, data forwarding is performed directly from the second node to the first node.

Preferably, The operation that third node notifies the information of the first node to the second node includes: the third node notifies the information of the first node to the second node in a newly defined message or an existing X2 message. The operation that third node receives the indication information from the second node includes: the third node receives an X2 handover request message from the second node, wherein the X2 handover request message carries the indication information. The operation that third node transmits the forwarding address of the first node to the second node includes: the third node transmits the forwarding address of the first node to the second node in an X2 handover request confirmation message.

Preferably, after the third node transmits the forwarding address of the first node to the second node, the method further includes: after the second node acquires the forwarding address of the first node, data forwarding is performed directly from the second node to the first node.

Preferably, The operation that third node notifies the information of the second node to the first node includes: the third node notifies the information of the second node to the first node in an SeNB adding request message. The operation that third node receives the indication information from the first node includes: the third node receives an SeNB adding request confirmation message from the first node, wherein the SeNB adding request confirmation message carries the indication information. The operation that third node transmits the forwarding address of the first node to the second node includes: the third node transmits the forwarding address of the first node to the second node in a handover request confirmation message.

Preferably, after the third node transmits the forwarding address of the first node to the second node, the method further includes: after the second node acquires the forwarding address of the first node, data forwarding is performed directly from the second node to the first node.

Preferably, The operation that third node notifies the information of the first node to the second node includes: the third node notifies the information of the first node to the second node in a newly defined message or an existing X2 message. The operation that third node receives the indication information from the second node includes: the third node receives an X2 handover request message from the second node, wherein the X2 handover request message carries the indication information. The operation that third node transmits the forwarding address of the first node to the second node includes: the third node transmits the forwarding address of the first node to the second node in an X2 handover request confirmation message.

Preferably, after the third node transmits the forwarding address of the first node to the second node, the method further includes: after the second node acquires the forwarding address of the first node, data forwarding is performed directly from the second node to the first node.

Preferably, The operation that third node notifies the information of the first node to the second node includes: the third node notifies the information of the first node to the second node in an X2 handover request message. The operation that third node receives the indication information from the second node includes: the third node receives an X2 handover request confirmation message from the second node, wherein the X2 handover request confirmation message carries the indication information. The operation that third node transmits the forwarding address of the second node to the first node includes: the third node transmits the forwarding address of the second node to the first node in an SeNB release request message.

Preferably, after the third node transmits the forwarding address of the second node to the first node, the method further includes: after the first node acquires the forwarding address of the second node, data forwarding is performed directly from the first node to the second node.

Preferably, The operation that third node notifies the information of the second node to the first node includes: the third node notifies the information of the second node to the first node in a newly defined message or an existing dual connectivity message. The operation that third node receives the indication information from the first node includes: the third node receives a confirmation message of the newly defined message or a confirmation message of the dual connectivity message from the first node, wherein the confirmation message of the newly defined message or the confirmation message of the dual connectivity message carries the indication information. The operation that third node transmits the forwarding address of the second node to the first node includes: the third node transmits the forwarding address of the second node to the first node in an SeNB release request message.

Preferably, after the third node transmits the forwarding address of the second node to the first node, the method further includes: after the first node acquires the forwarding address of the second node, data forwarding is performed directly from the first node to the second node.

Preferably, the first node is an SeNB during inter-MeNB handover with the SeNB unchanged, the second node is a T-MeNB during inter-MeNB handover with the SeNB unchanged and the third node is an S-MeNB dining inter-MeNB handover with the SeNB unchanged; or the first node is the SeNB during inter-MeNB handover with the SeNB unchanged, the second node is the S-MeNB during the inter-MeNB handover with the SeNB unchanged and the third node is the T-MeNB during inter-MeNB handover with the SeNB unchanged; or the first node is a T-SeNB in a process of adding an SeNB after handover, the second node is an eNB in the process of adding the SeNB after handover and the third node is a T-MeNB in the process of adding the SeNB after handover; or the first node is a T-SeNB during inter-MeNB handover together with inter-SeNB handover, the second node is an S-MeNB during inter-MeNB handover together with inter-SeNB handover and the third node is a T-MeNB during inter-MeNB handover together with the inter-SeNB handover; or the first node is an S-SeNB during inter-MeNB handover together with the inter-SeNB handover, the second node is the T-MeNB during inter-MeNB handover together with the inter-SeNB handover and the third node is the S-MeNB during inter-MeNB handover together with the inter-SeNB handover.

Preferably, the forwarding address includes: GPRS tunneling protocol information forwarded by uplink data and GPRS tunneling protocol information forwarded by downlink data; the GPRS tunneling protocol includes: a transmission layer address and a GPRS TEID.

According to still another aspect of the embodiments of the disclosure, a data transmission method is provided.

According to the embodiments of the disclosure, the data transmission method includes: in a condition that a third node is required to acquire whether an X2 interface exists between a first node and a second node, the third node notifies information of the first node to the second node, such The operation that second node determines whether the X2 interface exists between the second node and the first node; or the third node notifies information of the second node to the first node, such that the first node determines whether the X2 interface exists between the first node and the second node; the third node receives a forwarding address of the second node or a forwarding address of the first node from a fourth node, wherein the forwarding address of the second node or the forwarding address of the first node is transmitted after the fourth node acquires indication information, and the indication information is used to indicate that the X2 interface exists between the second node and the first node or the indication information is used to indicate that a direct-forwarding path is available; and the third node transmits the forwarding address of the second node to the first node, or the third node transmits the forwarding address of the first node to the second node.

Preferably, The operation that third node notifies the information of the first node to the second node includes: the third node notifies the information of the first node to the fourth node in an X2 handover request message, and the fourth notifies the information of the first node to the second node via an SeNB adding request message. The operation that third node receives the forwarding address of the second node from the fourth node includes: the fourth node receives an SeNB adding request confirmation message from the second node, wherein the SeNB adding request confirmation message carries the indication information; the fourth node transmits the forwarding address of the second node to the third node in an X2 handover request confirmation message. The operation that third node transmits the forwarding address of the second node to the first node include: the third node transmits the forwarding address of the second node to the first node in an SeNB release request message.

Preferably, after the third node transmits the forwarding address of the second node to the first node, the method further includes: after the first node acquires the forwarding address of the second node, data forwarding is performed directly from the first node to the second node.

Preferably, The operation that third node notifies the information of the second node to the first node includes: the third node notifies the information of the second node to the first node in a newly defined message or an existing dual connectivity message. The operation that third node receives the forwarding address of the second node from the fourth node includes: the third node receives a newly defined confirmation message or an existing dual connectivity confirmation message from the first node, wherein the newly defined confirmation message or the existing dual connectivity confirmation message carries the indication information; the third node transmits the indication information to the fourth node in an X2 handover request message; the third node receives an X2 handover request confirmation message from the fourth node, wherein the X2 handover request confirmation message carries the forwarding address of the second node. The operation that third node transmits the forwarding address of the second node to the first node includes: the third node transmits the forwarding address of the second node to the first node in an SeNB release request message.

Preferably, after the third node transmits the forwarding address of the second node to the first node, the method further includes: after the first node acquires the forwarding address of the second node, data forwarding is performed directly from the first node to the second node.

Preferably, the first node is an S-SeNB during inter-MeNB handover together with the inter-SeNB handover, the second node is a T-SeNB during inter-MeNB handover together with the inter-SeNB handover, the third node is an S-MeNB during inter-MeNB handover together with the inter-SeNB handover and the fourth node is a T-MeNB during inter-MeNB handover together with the inter-SeNB handover.

Preferably, the forwarding address includes: GPRS tunneling protocol information forwarded by uplink data and GPRS tunneling protocol information forwarded by downlink data; the GPRS tunneling protocol includes: a transmission layer address and a GPRS TEID.

According to still another aspect of the embodiments of the disclosure, a data transmission device is provided.

According to the embodiments of the disclosure, the data transmission device includes: a transmission module, configured to directly transmit a forwarding address of the device to a second node in a condition of acquiring an X2 interface exists between the transmission module and the second node.

According to still another aspect of the embodiments of the disclosure, a data transmission device is provided.

According to the embodiments of the disclosure, the data transmission device includes: a notification module, configured to notify information of a first node to a second node in a condition that whether an X2 interface exists between the first node and the second node is required to be determined, such that the second node determines whether the X2 interface exists between the second node and the first node; or notify information of a second node to a first node, such that the first node determines whether the X2 interface exists between the first node and the second node; a receiving module, configured to receive indication information from the second node or the first node, wherein the indication information is used to indicate that the X2 interface exists between the second node and the first node or the indication information is used to indicate that a direct-forwarding path is available; and a transmission module, configured to transmit a forwarding address of the second node to the first node, or transmit a forwarding address of the first node to the second node.

According to still another aspect of the embodiments of the disclosure, a data transmission device is provided.

According to the embodiments of the disclosure, the data transmission device includes: a notification module, configured to notify information of a first node to a second node in a condition that whether an X2 interface exists between the first node and the second node is required to be determined, such that the second node determines whether the X2 interface exists between the second node and the first node; or notify information of a second node to a first node, such that the first node determines whether the X2 interface exists between the first node and the second node; a receiving module, configured to receive a forwarding address of the second node or a forwarding address of the first node from a fourth node, wherein the forwarding address of the second node or the forwarding address of the first node are transmitted after the fourth node acquires indication information, and the indication information is used to indicate that the X2 interface exists between the second node and the first node or the indication information is used to indicate a direct-forwarding path is available; and a transmission module, configured to transmit a forwarding address of the second node to the first node, or transmit a forwarding address of the first node to the second node.

Through the embodiments of the disclosure, by adopting the first solution that in the condition in which the first node acquires whether the X2 interface exists between the first node and the second node, the first node directly transmits the forwarding address of the first node to the second node, or the second solution that in the condition in which the third node is required to acquires whether the X2 interface exists between the first node and the second node, the third node notifies the information of the first node to the second node, such that the second node determines whether the X2 interface exists between the second node and the first node, or the third node notifies the information of the second node to the first node, such that the first node determines whether the X2 interface exists between the first node and the second node, the third node receives the indication information from the second node or the first node, wherein the indication information is used to indicate that the X2 interface exists between the second node and the first node or the indication information is used to indicate that the direct-forwarding path is available, the third node transmits the forwarding address of the second node to the first node, or the third node transmits the forwarding address of the first node to the second node, or the solution 3 that in the condition in which the third node is required to acquire whether the X2 interface exists between the first node and the second node, the third node notifies the information of the first node to the second node, such that the second node determines whether the X2 interface exists between the second node and the first node, or the third node notifies the information of the second node to the first node, such that the first node determines whether the X2 interface exists between the first node and the second node, the third node receives the forwarding address of the second node or the forwarding address of the first node from the fourth node, wherein the forwarding address of the second node or the forwarding address of the first node is transmitted after the fourth node acquires the indication information, wherein the indication information is used to indicate that the X2 interface exists between the second node and the first node or the indication information is used to indicate that the direct-forwarding path is available, the third node transmits the forwarding address of the second node to the first node, or the third node transmits the forwarding address of the first node to the second node, the problem in the related art regarding how to optimize the data forwarding in the scenario of the dual connectivity handover is addressed, thereby improving flexibility and applicability of the data forwarding.

BRIEF DESCRIPTION OF DRAWINGS

Accompanying drawings are described herein to provide further understanding of the disclosure, and form a part of the disclosure. Schematic embodiments and description of the schematic embodiments are adopted to explain the disclosure, but do not form improper limits to the disclosure, in which:

FIG. 8 is a flowchart of a data transmission method according to an embodiment of the disclosure.

FIG. 24 is a structure block diagram of a data transmission device according to an embodiment of the disclosure.

FIG. 25 is a structure block diagram of another data transmission device according to an embodiment of the disclosure.

FIG. 26 is a structure block diagram of another data transmission device according to an embodiment of the disclosure.

DETAILED DESCRIPTION

The disclosure is described below with reference to the drawings and embodiments in detail. It should be noted that the embodiments of the disclosure and the characteristics of the embodiments may be combined with each other if there is no conflict.

It should be noted that, terminologies such as "first" and "second" in the specification, claims and accompanying drawings of the disclosure are only used to distinguish similar objects, rather than to describe a special order or a precedence order.

The embodiment here provides a data transmission method. FIG. 8 is a flowchart of a data transmission method according to an embodiment of the disclosure. As shown in FIG. 8, the flowchart may include step S802.

In step S802, in a condition that a first node acquires whether an X2 interface exists between the first node and a second node, the first node directly transmits a forwarding address of the first node to the second node.

Through the above step, the first node directly transmits the forwarding address of the first node to the second node upon acquiring whether the X2 interface exists between the first node and the second node, so a problem in the related art regarding how to optimize data forwarding in a scenario of dual connectivity handover is addressed, thereby improving flexibility and applicability of the data forwarding.

In a preferred implementation process, the forwarding address may include but not limited to: GPRS tunneling protocol information forwarded by uplink data and GPRS tunneling protocol information forwarded by downlink data, wherein the GPRS tunneling protocol information may include but not limited to: a transmission layer address and a GPRS TEID.

Preferably, in the step S802, the first node may transmit the forwarding address of the first node to the second node using one of the following methods.

Method 1: the first node transmits the forwarding address of the first node to the second node in an SeNB modification request message.

Method 2: the first node transmits the forwarding address of the first node to the second node in an SeNB adding message.

Method 3: the first node transmits the forwarding address of the first node to the second node in an SeNB reconfiguration completion message.

Method 4: the first node transmits the forwarding address of the first node to the second node in a pre-defined new message.

Preferably, in the step S802, after the first node transmits the forwarding address of the first node to the second node, the method further may include step S1.

In step S1, in a condition that the second node acquires the forwarding address of the first node, the data forwarding is performed directly from the second node to the first node.

In a preferred implementation process, the first node is a T-MeNB during inter-MeNB handover with the SeNB unchanged; the second node is an SeNB during inter-MeNB handover with the SeNB unchanged.

Figure 9:
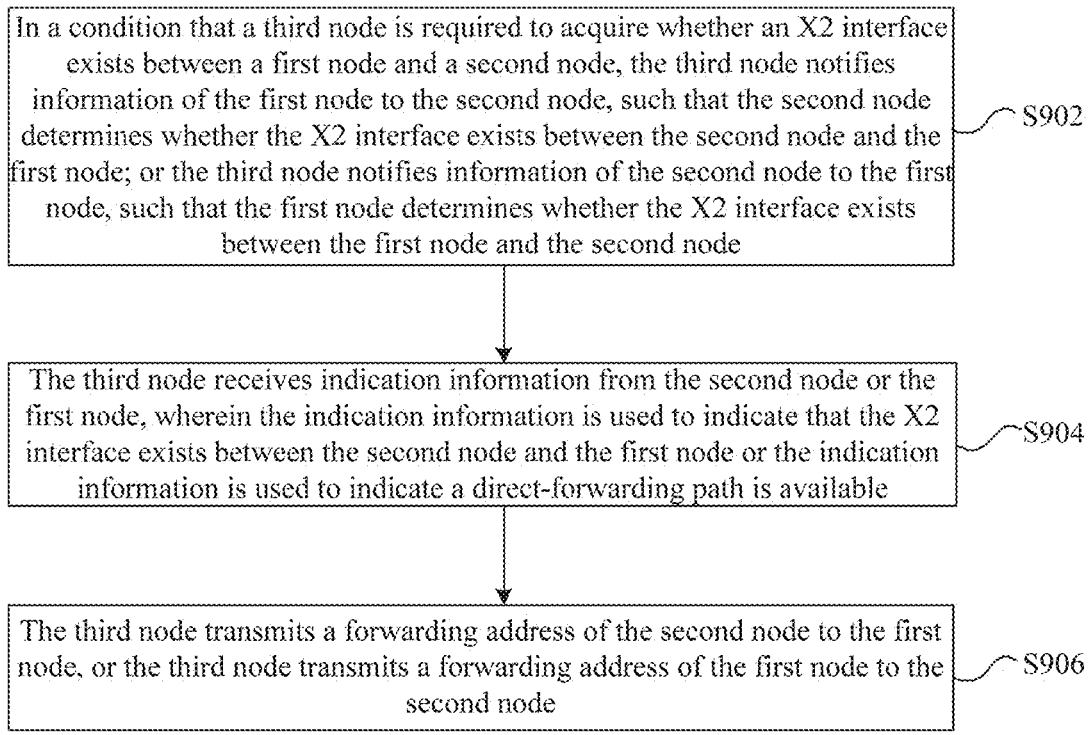
FIG. 9 is a flowchart of another data transmission method according to an embodiment of the disclosure.

The embodiment here provides another data transmission method. FIG. 9 is a flowchart of another data transmission method according to an embodiment of the disclosure. As shown in FIG. 9, the flowchart may include the following steps S902, S904 and S906.

In step S902, in a condition that a third node is required to acquire whether an X2 interface exists between a first node and a second node, the third node notifies information of the first node to the second node, such that the second node determines whether the X2 interface exists between the second node and the first node; or the third node notifies information of the second node to the first node, such that the first node determines whether the X2 interface exists between the first node and the second node.

In step S904, the third node receives indication information from the second node or the first node, wherein the indication information is used to indicate that the X2 interface exists between the second node and the first node or the indication information is used to indicate a direct-forwarding path is available.

In step S906, the third node transmits a forwarding address of the second node to the first node, or the third node transmits a forwarding address of the first node to the second node.

In a preferred implementation process, the forwarding address may include but not limited to: GPRS tunneling protocol information forwarded by uplink data and GPRS tunneling protocol information forwarded by downlink data, wherein the GPRS tunneling protocol information may include but not limited to: a transmission layer address and a GPRS TEID.

Preferably, in the step S902, the operation that the third node notifies the information of the first node to the second node may include step S2.

In step S2, the third node notifies the information of the first node to the second node in an X2 handover request message.

In the step S904, the third node receives the indication information from the second node may include step S3.

In step S3, the third node receives an X2 handover request confirmation message from the second node, wherein the X2 handover request confirmation message carries the indication information.

In step S906, the third node transmits the forwarding address of the second node to the first node may include step S4.

In step S4, the third node transmits the forwarding address of the second node to the first node in an SeNB release request message.

Preferably, in the step S906, after the third node transmits the forwarding address of the second node to the first node, the method further may include step S5.

In step S5, after the first node acquires the forwarding address of the second node, data forwarding is performed directly from the first node to the second node.

Preferably, in the step S902, the third node notifies the information of the second node to the first node may include step S6.

In step S6, the third node notifies the information of the second node to the first node in a newly defined message or an existing dual connectivity message.

In step S904, the third node receives the indication information from the first node may include step S7.

In step S7, the third node receives a confirmation message of the newly defined message or a confirmation message of the dual connectivity message from the first node, wherein the confirmation message of the newly defined message or the confirmation message of the dual connectivity message carries the indication information.

In step S906, the operation that the third node transmits the forwarding address of the second node to the first node may include step S8.

In step S8, the third node transmits the forwarding address of the second node to the first node in an SeNB release request message.

Preferably, in step S906, after the third node transmits the forwarding address of the second node to the first node, the method further may include step S9.

In step S9, after the first node acquires the forwarding address of the second node, data forwarding is performed directly from the first node to the second node.

Preferably, in the step S902, the operation that the third node notifies the information of the second node to the first node may include step S10.

In step S10, the third node notifies the information of the second node to the first node in an SeNB modification request message or an SeNB adding request message or a newly defined message.

In step S904, the operation that the third node receives the indication information from the first node may include step S11.

In step S11, the third node receives an SeNB modification request confirmation information or an SeNB adding request confirmation message or a newly defined confirmation message from the first node, wherein the SeNB modification request confirmation information or the SeNB adding request confirmation message or the newly defined confirmation message carries the indication information.

In step S906, the operation that the third node transmits the forwarding address of the first node to the second node may include step S12.

In step S12, the third node transmits the forwarding address of the first node to the second node in an X2 handover request confirmation message.

Preferably, in the step S906, after the third node transmits the forwarding address of the first node to the second node, the method further may include a following operation.

In step S13, after the second node acquires the forwarding address of the first node, data forwarding is performed directly from the second node to the first node.

Preferably, in the step S902, the operation that the third node notifies the information of the first node to the second node may include step S14.

In step S14, the third node notifies the information of the first node to the second node in a newly defined message or an existing X2 message.

In step S904, the operation that the third node receives the indication information from the second node may include step S15.

In step S15, the third node receives an X2 handover request message from the second node, wherein the X2 handover request message carries the indication information.

In step S906, the operation that the third node transmits the forwarding address of the first node to the second node may include step S16.

In step S16, the third node transmits the forwarding address of the first node to the second node in an X2 handover request confirmation message.

Preferably, in the step S906, after the third node transmits the forwarding address of the first node to the second node, the method further may include step S17.

In step S17, after the second node acquires the forwarding address of the first node, data forwarding is performed directly from the second node to the first node.

Preferably, in step S902, the operation that the third node notifies the information of the second node to the first node may include step S18.

In step S18, the third node notifies the information of the second node to the first node in an SeNB adding request message.

In step S904, the operation that the third node receives the indication information from the first node may include step S19.

In step S19, the third node receives an SeNB adding request confirmation message from the first node, wherein the SeNB adding request confirmation message carries the indication information.

In step S906, the operation that the third node transmits the forwarding address of the first node to the second node may include step S20.

In step S20, the third node transmits the forwarding address of the first node to the second node in an X2 handover request confirmation message.

Preferably, in step S906, after the third node transmits the forwarding address of the first node to the second node, the method further may include step S21.

In step S21, after the second node acquires the forwarding address of the first node, data forwarding is performed directly from the second node to the first node.

Preferably, in the step S902, the operation that the third node notifies the information of the first node to the second node may include step S22.

In step S22, the third node notifies the information of the first node to the second node in a newly defined message or an existing X2 message.

In step S904, the operation that the third node receives the indication information from the second node may include step S23.

In step S23, the third node receives an X2 handover request message from the second node, wherein the X2 handover request message carries the indication information.

In step S906, the operation that the third node transmits the forwarding address of the first node to the second node may include step S24.

In step S24, the third node transmits the forwarding address of the first node to the second node in an X2 handover request confirmation message.

Preferably, in the step S906, after the third node transmits the forwarding address of the first node to the second node, the method further may include step S25.

In step S25, after the second node acquires the forwarding address of the first node, data forwarding is performed directly from the second node to the first node.

Preferably, in the step S902, the operation that the third node notifies the information of the second node to the first node may include step S26.

In step S26, the third node notifies the information of the second node to the first node in an SeNB adding request message.

In the step S904, the operation that the third node receives the indication information from the first node may include step S27.

In step S27, the third node receives an SeNB adding request confirmation message from the first node, wherein the SeNB adding request confirmation message carries the indication information.

In the step S906, the operation that the third node transmits the forwarding address of the first node to the second node may include step S28.

In step S28, the third node transmits the forwarding address of the first node to the second node in a handover request confirmation message.

Preferably, in the step S906, after the third node transmits the forwarding address of the first node to the second node, the method further may include step S29.

In step S29, after the second node acquires the forwarding address of the first node, data forwarding is performed directly from the second node to the first node.

Preferably, in the step S902, the third node notifies the information of the first node to the second node may include step S30.

In step S30, the third node notifies the information of the first node to the second node in a newly defined message or an existing X2 message.

In the step S904, the operation that the third node receives the indication information from the second node may include step S31.

In step S31, the third node receives an X2 handover request message from the second node, wherein the X2 handover request message carries the indication information.

In the step S906, the third node transmits the forwarding address of the first node to the second node may include step S32.

In step S32, the third node transmits the forwarding address of the first node to the second node in an X2 handover request confirmation message.

Preferably, in the step S906, after the third node transmits the forwarding address of the first node to the second node, the method further may include step S33.

In step S33, after the second node acquires the forwarding address of the first node, data forwarding is performed directly from the second node to the first node.

Preferably, in the step S902, the operation that the third node notifies the information of the first node to the second node may include step S34.

In step S34, the third node notifies the information of the first node to the second node in an X2 handover request message.

In the step S904, the operation that the third node receives the indication information from the second node may include step S35.

In step S35, the third node receives an X2 handover request confirmation message from the second node, wherein the X2 handover request confirmation message carries the indication information.

In the step S906, the operation that the third node transmits the forwarding address of the second node to the first node may include step S36.

In step S36, the third node transmits the forwarding address of the second node to the first node in an SeNB release request message.

Preferably, in the step S906, after the third node transmits the forwarding address of the second node to the first node, the method further may include step S37.

In step S37, after the first node acquires the forwarding address of the second node, data forwarding is performed directly from the first node to the second node.

Preferably, in the step S902, the operation that the third node notifies the information of the second node to the first node may include step S38.

In step S38, the third node notifies the information of the second node to the first node in a newly defined message or an existing dual connectivity message.

In the step S904, the operation that the third node receives the indication information from the first node may include step S39.

In step S39, the third node receives a confirmation message of the newly defined message or a confirmation message of the dual connectivity message from the first node, wherein the confirmation message of the newly defined message or the confirmation message of the dual connectivity message carries the indication information.

In the step S906, the operation that the third node transmits the forwarding address of the second node to the first node may include step S40.

In step S40, the third node transmits the forwarding address of the second node to the first node in an SeNB release request message.

Preferably, in the step S906, after the third node transmits the forwarding address of the second node to the first node, the method further may include step S41.

In step S41, after the first node acquires the forwarding address of the second node, data forwarding is performed directly from the first node to the second node.

In a preferred implementation process, network entities to which the first node, the second node and the third node are respectively belonged may be flexibly determined according to actual application scenarios, in which, (1) the first node is an SeNB during inter-MeNB handover with the SeNB unchanged, the second node is a T-MeNB during inter-MeNB handover with the SeNB unchanged and the third node is an S-MeNB during inter-MeNB handover with the SeNB unchanged; or, (2) the first node is an SeNB during inter-MeNB handover with the SeNB unchanged, the second node is an S-MeNB during inter-MeNB handover with the SeNB unchanged and the third node is a T-MeNB during inter-MeNB handover with the SeNB unchanged; or, (3) the first node is a T-SeNB in a process of adding an SeNB after the handover, the second node is an eNB in the process of adding the SeNB after the handover and the third node is a T-MeNB in the process of adding the SeNB after the handover; or, (4) the first node is a T-SeNB during inter-MeNB handover together with inter-SeNB handover, the second node is an S-MeNB during inter-MeNB handover together with the inter-SeNB handover and the third node is a T-MeNB during inter-MeNB handover together with the inter-SeNB handover; or, (5) the first node is an S-SeNB during inter-MeNB handover together with the inter-SeNB handover, the second node is the T-MeNB during inter-MeNB handover together with the inter-SeNB handover and the third node is the S-MeNB during inter-MeNB handover together with the inter-SeNB handover.

Figure 10:
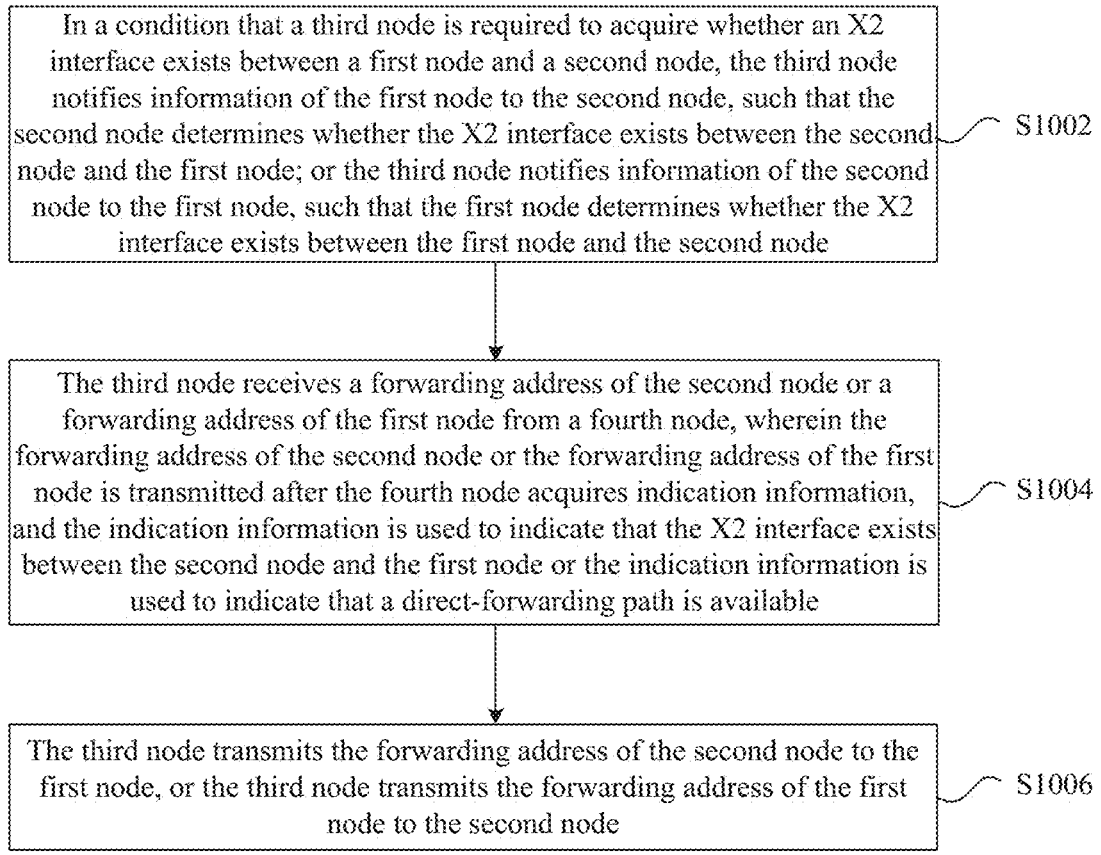
FIG. 10 is a flowchart of another data transmission method according to an embodiment of the disclosure.

The embodiment herein provides a data transmission method, FIG. 10 is a flowchart of another data transmission method according to an embodiment of the disclosure. As shown in FIG. 10, the flowchart may include steps S1002, S1004 and S1006.

In step S1002, in a condition that a third node is required to acquire whether an X2 interface exists between a first node and a second node, the third node notifies information of the first node to the second node, such that the second node determines whether the X2 interface exists between the second node and the first node; or the third node notifies information of the second node to the first node, such that the first node determines whether the X2 interface exists between the first node and the second node.

In step S1004, the third node receives a forwarding address of the second node or a forwarding address of the first node from a fourth node, wherein the forwarding address of the second node or the forwarding address of the first node is transmitted after the fourth node acquires indication information, and the indication information is used to indicate that the X2 interface exists between the second node and the first node or the indication information is used to indicate that a direct-forwarding path is available.

In step S1006, the third node transmits the forwarding address of the second node to the first node, or the third node transmits the forwarding address of the first node to the second node.

In a preferred implementation process, the forwarding address may include but not limited to: GPRS tunneling protocol information forwarded by uplink data and GPRS tunneling protocol information forwarded by downlink data, wherein the GPRS tunneling protocol may include but not limited to: a transmission layer address and a GPRS TEID.

Preferably, in the step S1002, the third node notifies the information of the first node to the second node may include step S42.

In step S42, the third node notifies the information of the first node to the fourth node in an X2 handover request message, and the fourth notifies the information of the first node to the second node via an SeNB adding request message.

In step S1004, the operation that the third node receives the forwarding address of the second node from the fourth node may include a following operation.

In step S43, the fourth node receives an SeNB adding request confirmation message from the second node, wherein the SeNB adding request confirmation message carries the indication information; the fourth node transmits the forwarding address of the second node to the third node in an X2 handover request confirmation message.

In step S1006, the operation that the third node transmits the forwarding address of the second node to the first node may include step S44.

In step S44, the third node transmits the forwarding address of the second node to the first node in an SeNB release request message.

Preferably, in the step S1006, after the third node transmits the forwarding address of the second node to the first node, the method further may include step S45.

In step S45, after the first node acquires the forwarding address of the second node, data forwarding is performed directly from the first node to the second node.

Preferably, in the step S1002, the operation that the third node notifies the information of the second node to the first node may include step S46.

In step S46, the third node notifies the information of the second node to the first node in a newly defined message or an existing dual connectivity message.

In step S1004, the operation that the third node receives the forwarding address of the second node from the fourth node may include step S47.

In step S47, the third node receives a newly defined confirmation message or an existing dual connectivity confirmation message from the first node, wherein the newly defined confirmation message or the existing dual connectivity confirmation message carries the indication information.

In step S48, the third node transmits the indication information to the fourth node in an X2 handover request message.

In step S49, the third node receives an X2 handover request confirmation message from the fourth node, wherein the X2 handover request confirmation message carries the forwarding address of the second node.

In step S1006, the operation that third node transmits the forwarding address of the second node to the first node may include step S50.

In step S50, the third node transmits the forwarding address of the second node to the first node in an SeNB release request message.

Preferably, in the step S1006, after the third node transmits the forwarding address of the second node to the first node, the method further may include step S51.

In step S51, after the first node acquires the forwarding address of the second node, data forwarding is performed directly from the first node to the second node.

In a preferred implementation process, the first node may be an S-SeNB during inter-MeNB handover together with inter-SeNB handover, the second node may be a T-SeNB during inter-MeNB handover together with the inter-SeNB handover, the third node may be an S-MeNB during inter-MeNB handover together with the inter-SeNB handover and the fourth node may be a T-MeNB during inter-MeNB handover together with the inter-SeNB handover.

The above preferred implementation process will be further described below with reference to several preferred embodiments.

Preferred Embodiment One

Figure 1:
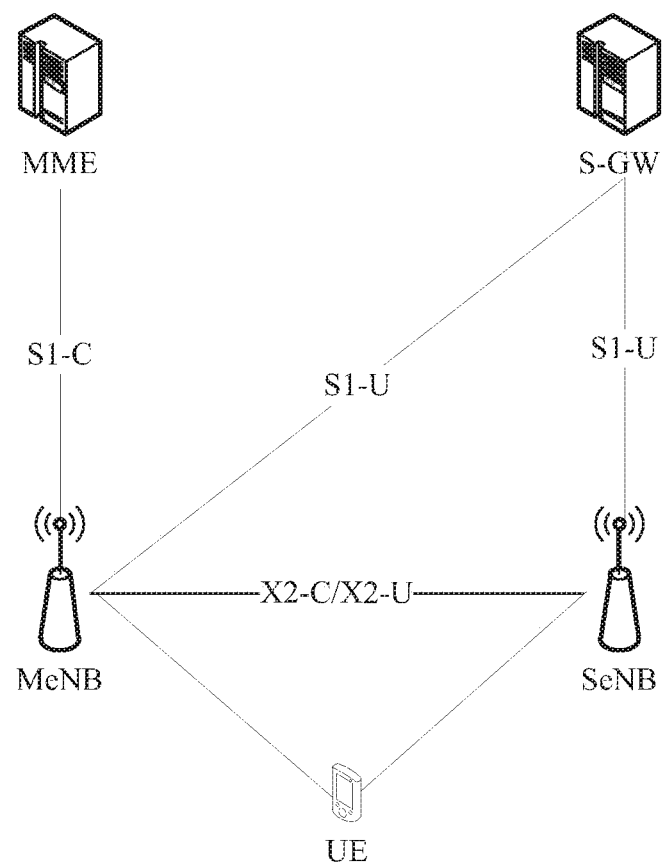
FIG. 1 is a schematic diagram of a dual connectivity architecture according to a related art.
Figure 2:
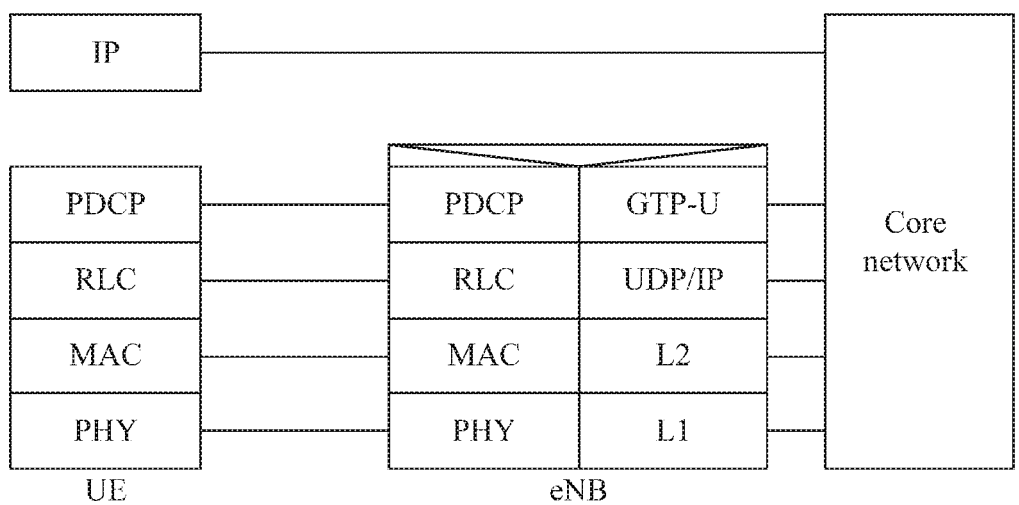
FIG. 2 is a schematic diagram of a data protocol stack for an LTE user plane according to the related art.
Figure 3:
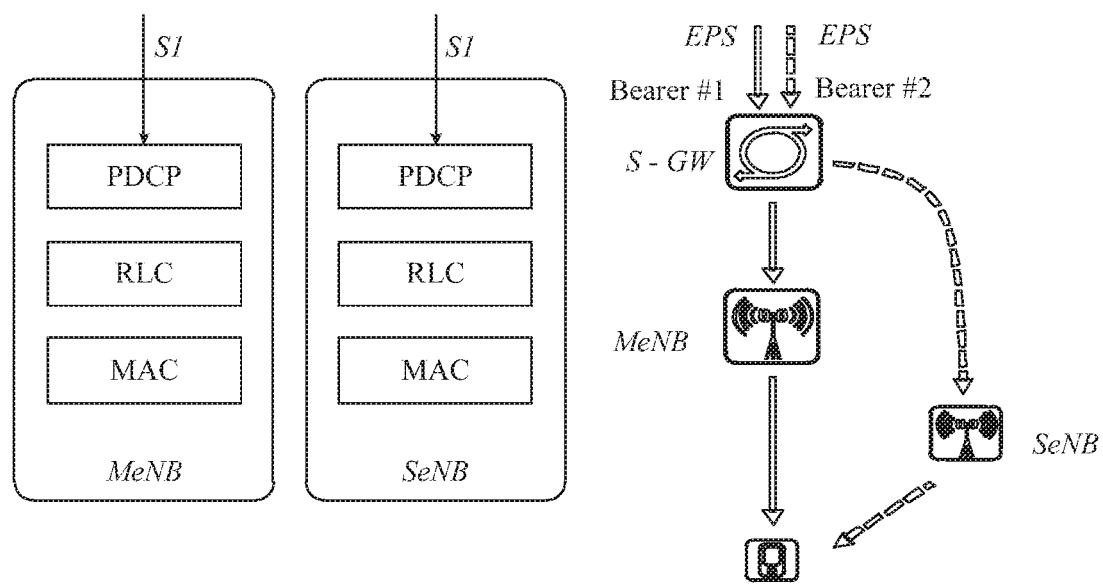
FIG. 3 is a schematic diagram of a shunting method for a 1A user plane according to the related art.
Figure 4:
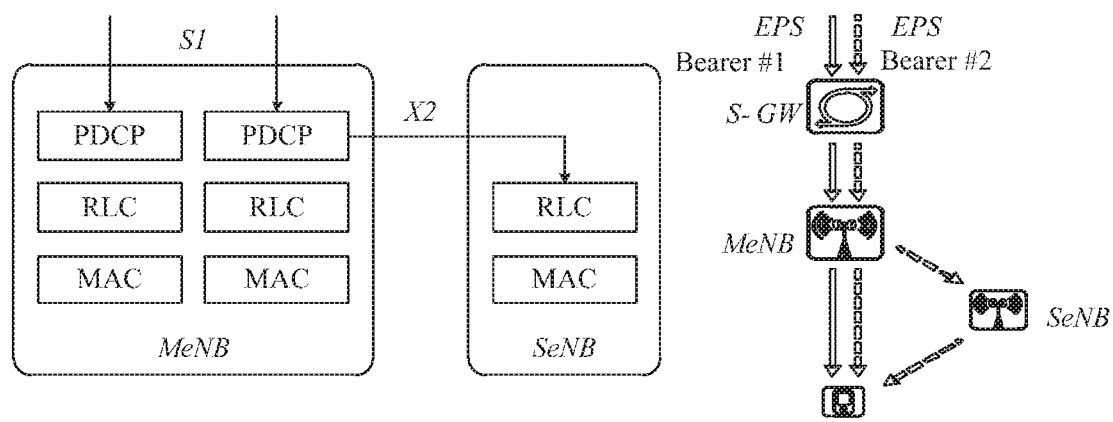
FIG. 4 is a schematic diagram of a shunting method for a 3C user plane according to the related art.
Figure 5:
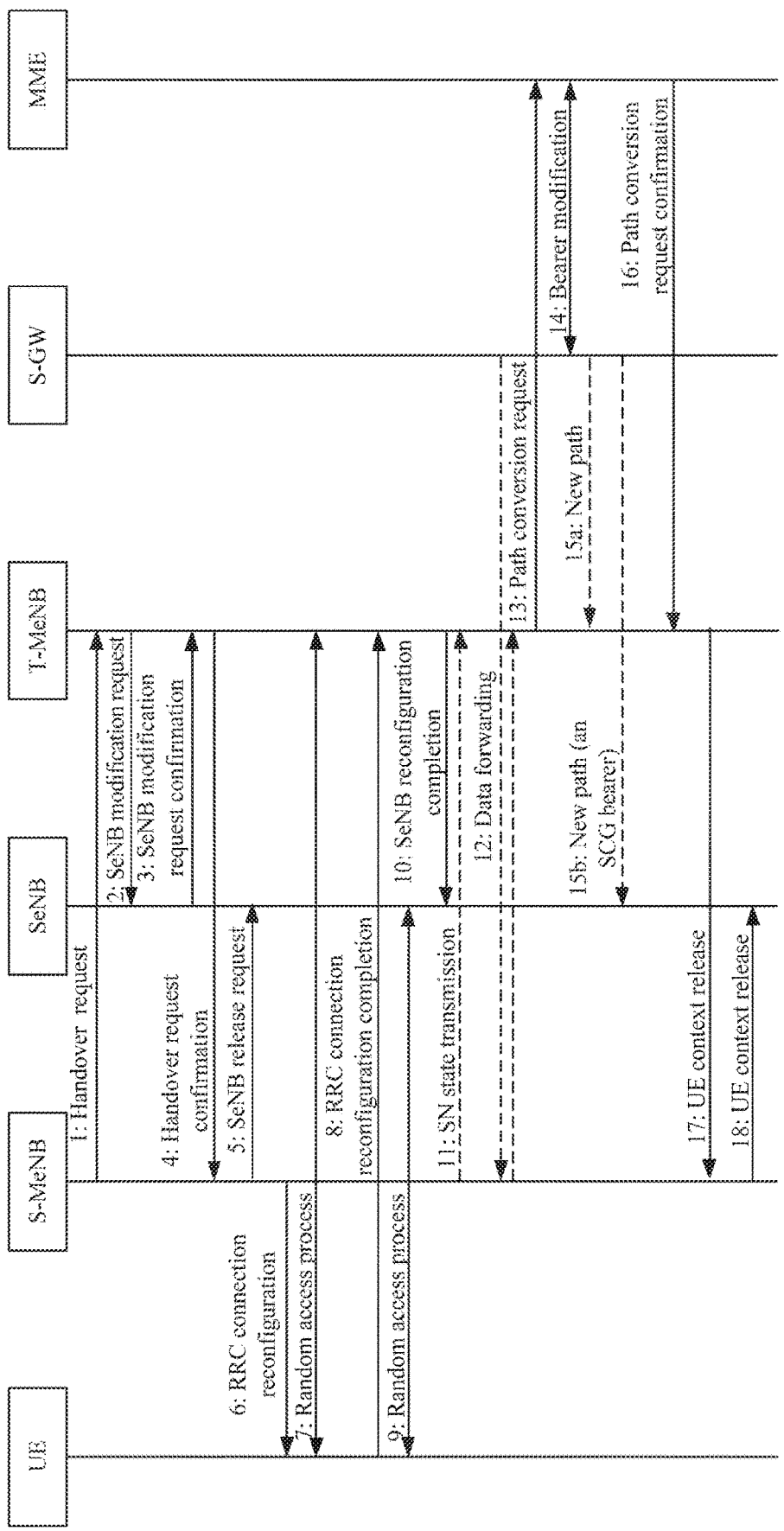
FIG. 5 is a signaling flowchart showing a process of an inter-MeNB handover with an SeNB unchanged according to the related art.
Figure 11:
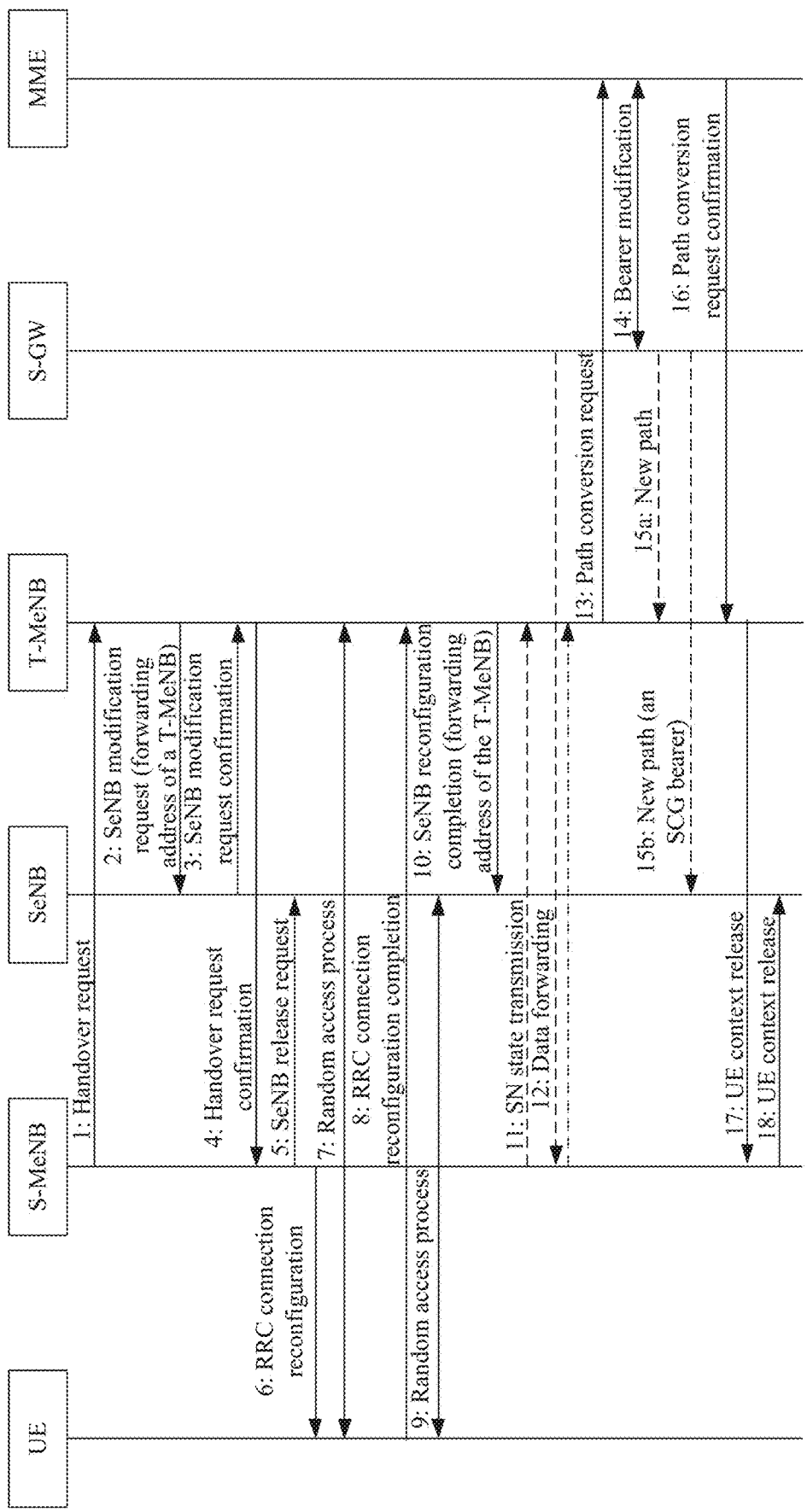
FIG. 11 is a flowchart of a process for performing data forwarding optimization based on FIG. 5 according to a first preferred embodiment of the disclosure.
Figure 12:
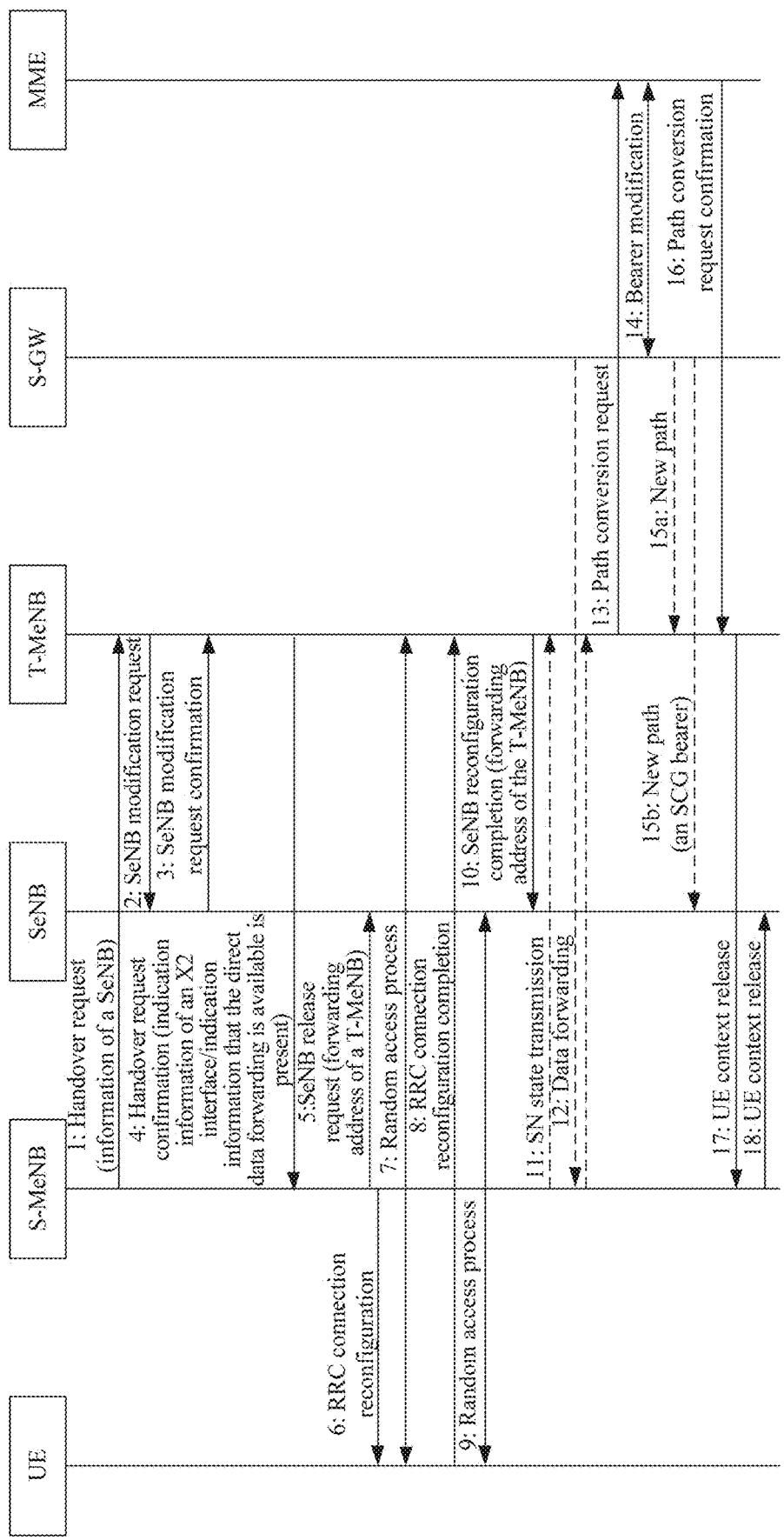
FIG. 12 is a flowchart of another process for performing data forwarding optimization based on FIG. 5 according to the first preferred embodiment of the disclosure.
Figure 13:
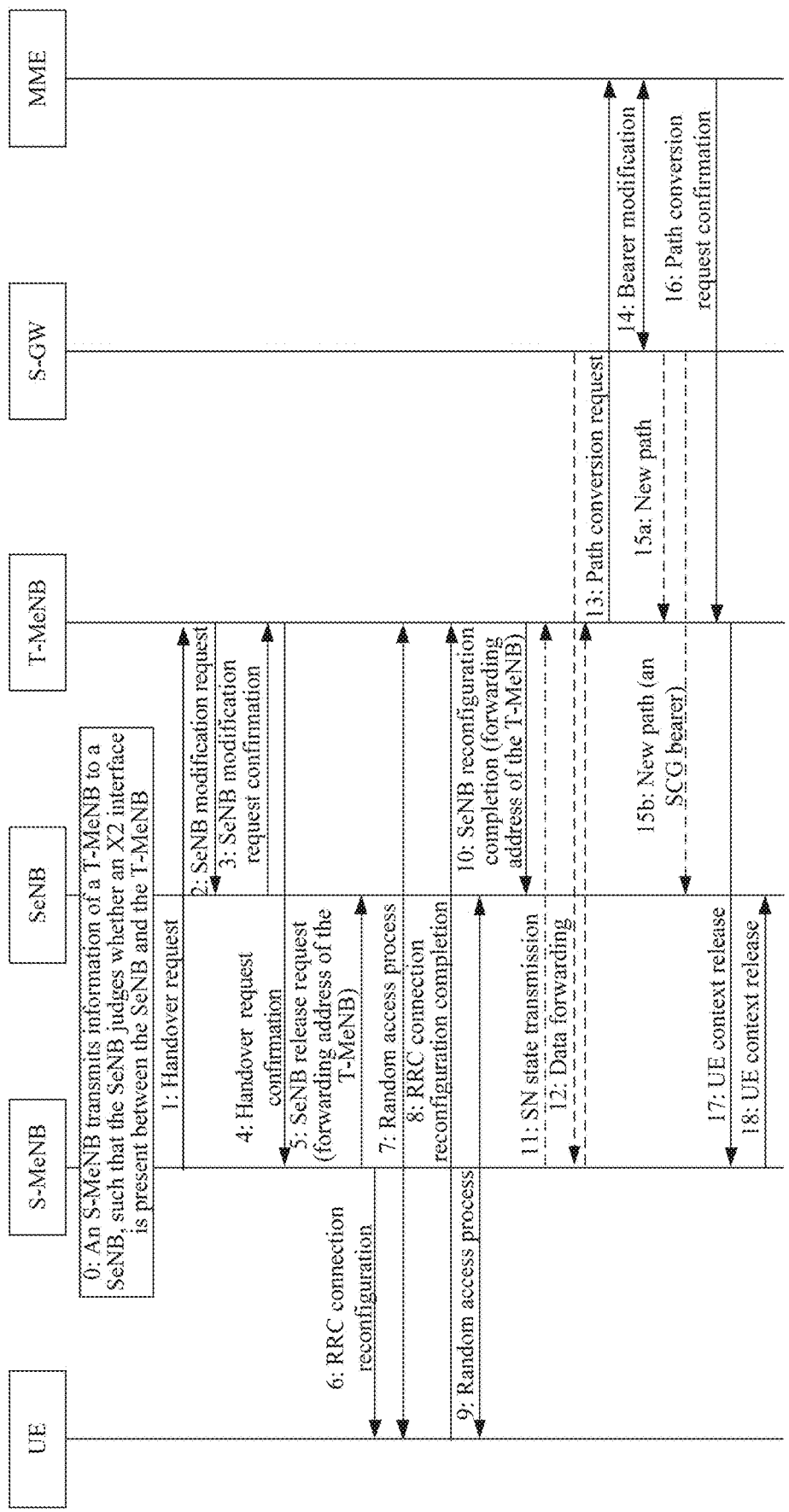
FIG. 13 is a flowchart of a still another process for performing data forwarding optimization based on FIG. 5 according to the first preferred embodiment of the disclosure.

FIG. 11 is a flowchart of a process for performing data forwarding optimization based on FIG. 5 according to a first preferred embodiment of the disclosure. FIG. 12 is a flowchart of another process for performing data forwarding optimization based on FIG. 5 according to the first preferred embodiment of the disclosure. FIG. 13 is a flowchart of a still another process for performing data forwarding optimization based on FIG. 5 according to the first preferred embodiment of the disclosure. The preferred embodiment is directed to optimize the data forwarding, from the SeNB to a T-MeNB (i.e., SeNB→T-MeNB), during inter-MeNB handover with the SeNB unchanged in FIG. 5. In the preferred implementation process, an SeNB modification request message is transferred in step 2 and an SeNB modification request confirmation message is transferred in the step 3, i.e., the step 2 and the step 3 involve preparation for SeNB modification during inter-MeNB handover. Of course, the step 2 and the step 3 further may be an enhanced SeNB adding preparation process, i.e., an SeNB adding request message is transferred in the step 2, and an SeNB adding request confirmation message is transferred in step 3. Alternatively, other newly defined message is transferred in step 2 and step 3. In the preferred embodiment, only that the SeNB modification request message is transferred in step 2 and the SeNB modification request confirmation message is transferred in step 3 is taken as an example to illustrate newly added information. However, in fact, the following manner is adopted to illustrate the newly added information: the SeNB adding request message or other newly defined message is transferred in step 2, and the SeNB adding request confirmation message or other newly defined message is transferred in step 3.

In the preferred embodiment, if the T-MeNB is required to acquire whether an X2 interface exists between the SeNB and the T-MeNB, as shown in FIG. 11, the signaling flowchart described in FIG. 5 may be modified according to one of the following methods.

Modification method 1: in step 2, as the X2 interface exists between the T-MeNB and the SeNB, the T-MeNB may transmit the data forwarding address of the T-MeNB to the SeNB in the SeNB modification request message. Then, the data forwarding may be performed directly from the SeNB to the T-MeNB (i.e., SeNB→T-MeNB).

Modification method 2: in the step 10, the T-MeNB determines whether the X2 interface exists between the T-MeNB and the SeNB. However, in the preferred embodiment, since the X2 interface exists between the T-MeNB and the SeNB, the T-MeNB may transmit the data forwarding address of the T-MeNB to the SeNB in an SeNB reconfiguration completion message. And then, the data forwarding may be performed directly from the SeNB to the T-MeNB (i.e., SeNB→T-MeNB).

In the preferred embodiment, if the S-MeNB is required to acquire whether the X2 interface exists between the SeNB to the T-MeNB, the manners 1 and 2 may be adopted.

Manner 1: the T-MeNB determines whether the X2 interface exists between the T-MeNB and the SeNB. As shown in FIG. 12, based on the signaling flowchart described in FIG. 5, the following improvements are made.

In the step 1, the S-MeNB may notify the information of the SeNB to the T-MeNB in the handover request message, such that in a subsequent signaling interaction process, the T-MeNB determines whether the X2 interface exists between the T-MeNB and the SeNB.

In the step 4, the T-MeNB determines whether the X2 interface exists between the T-MeNB and the SeNB. In the preferred embodiment, since the X2 interface exists between the T-MeNB and the SeNB, the T-MeNB enable following information to be included in the X2 handover request confirmation message: indication information indicating that the X2 interface exists between the SeNB and the T-MeNB, or indication information indicating that the direct data forwarding can be performed between the SeNB and the T-MeNB, wherein information carried in the X2 handover request confirmation message includes: the forwarding address of the T-MeNB.

In the step 5, the S-MeNB transmits the data forwarding address of the T-MeNB to the SeNB in the SeNB release request message, after acquiring that the X2 interface exists between the SeNB and the T-MeNB in the step 4; the S-MeNB enable the indication information supporting the direct forwarding to be included in the SeNB release request message.

Then, the direct data forwarding may be performed from the SeNB to the T-MeNB (i.e., SeNB→T-MeNB).

Method 2: the SeNB determines whether the X2 interface exists between the SeNB and the T-MeNB. As shown in FIG. 13, based on the signaling flowchart described in FIG. 5, the following improvements are made.

In the step 0, the S-MeNB notifies the information of the T-MeNB to the SeNB; the SeNB determines whether the X2 interface exists between the SeNB and the T-MeNB. In the preferred embodiment, since the X2 interface exists between the T-MeNB and the SeNB, the SeNB may notify the following information to the S-MeNB: t indication information indicating that the X2 interface exists between the T-MeNB and the SeNB, or indication information indicating that the data forwarding between the T-MeNB and the SeNB can be performed directly. The process here is a newly defined process based on FIG. 5.

In the step 5, the S-MeNB may notify the data forwarding address of the T-MeNB to the SeNB in the SeNB release request message.

Then, the data forwarding may be performed directly from the SeNB to the T-MeNB (i.e., SeNB→T-MeNB).

It is to be noted that, the data forwarding optimization process in the scenario of the dual connectivity handover concerned by the preferred embodiment is completed based on the signaling interaction flowchart of FIG. 5. Other steps not mentioned in FIG. 11 to FIG. 13 may be adopted with the corresponding steps in the signaling interaction flowchart shown in FIG. 5 and will not be repeated here.

Preferred Embodiment Two

Figure 14:
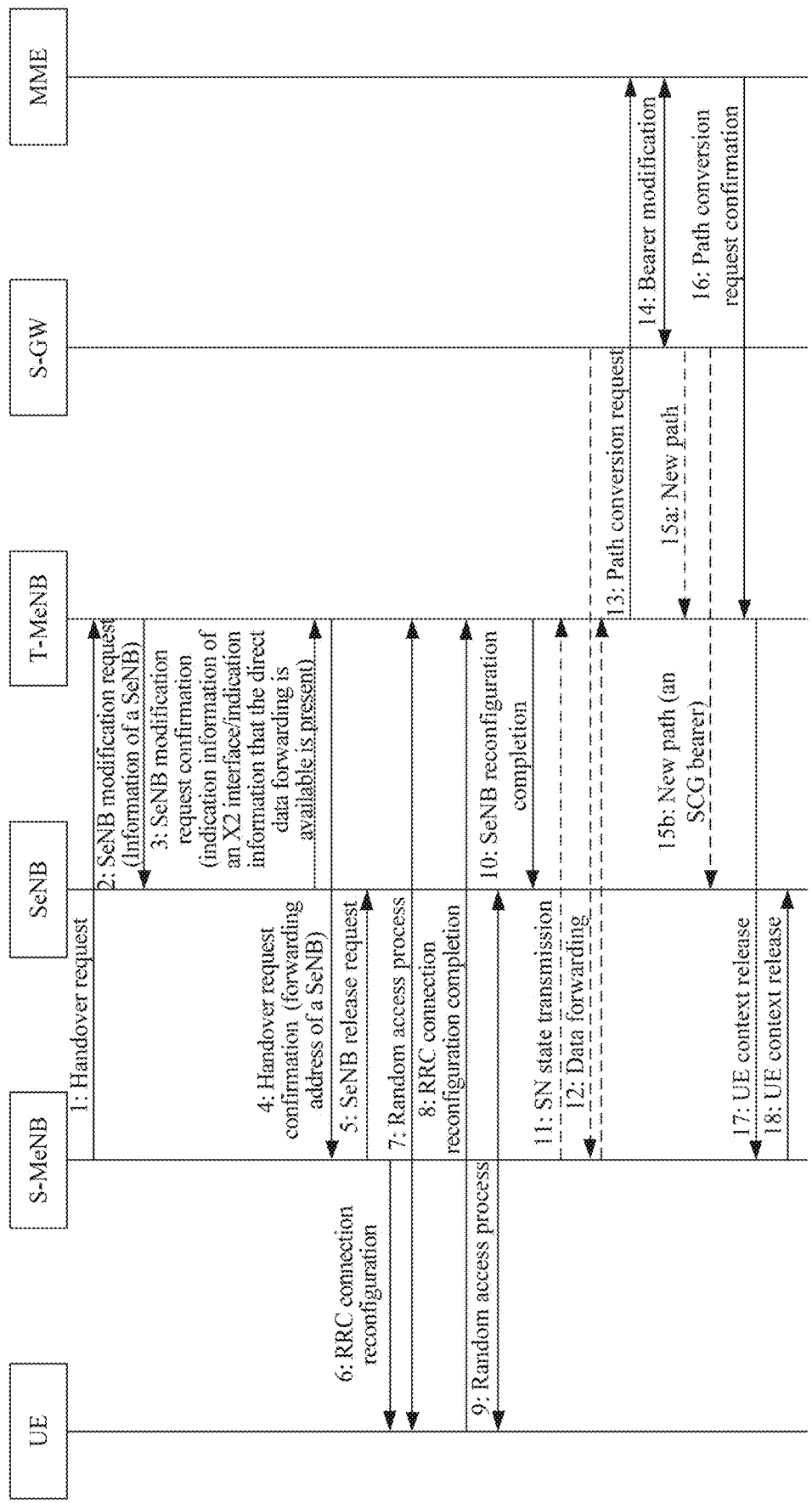
FIG. 14 is a flowchart of a process for performing data forwarding optimization based on FIG. 5 according to a second preferred embodiment of the disclosure.
Figure 15:
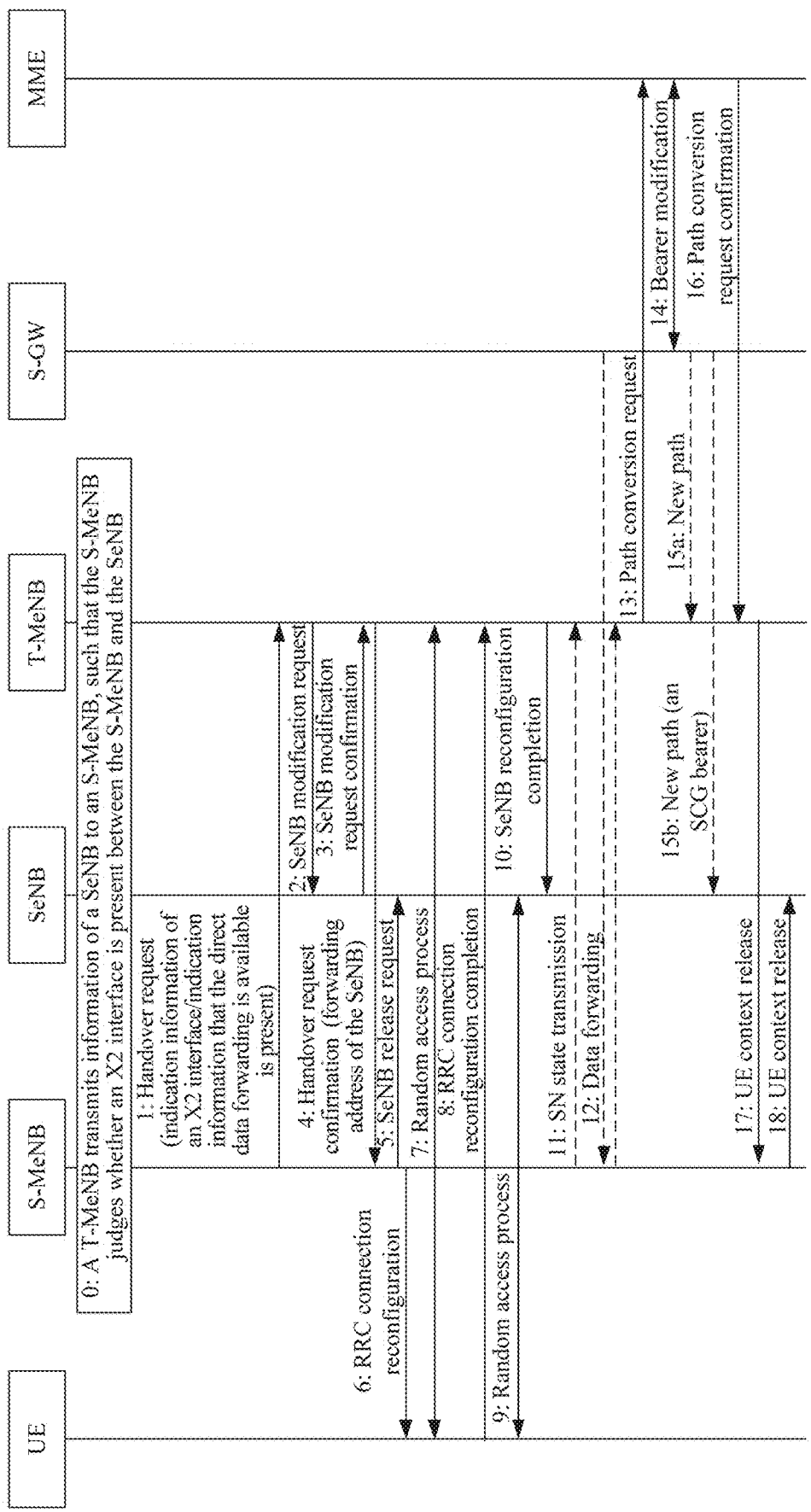
FIG. 15 is a flowchart of another process for performing data forwarding optimization based on FIG. 5 according to the second preferred embodiment of the disclosure.

FIG. 14 is a flowchart of a process for performing data forwarding optimization based on FIG. 5 according to a second preferred embodiment of the disclosure. FIG. 15 is a flowchart of another process for performing data forwarding optimization based on FIG. 5 according to the second preferred embodiment of the disclosure. The preferred embodiment is directed to optimizing the data forwarding, from the S-MeNB to an SeNB (i.e., S-MeNB→SeNB), during inter-MeNB handover with the SeNB unchanged in FIG. 5. In the preferred implementation process, an SeNB modification request message is transferred in step 2 and an SeNB modification request confirmation message is transferred in step 3, i.e., step 2 and step 3 involve preparation for SeNB modification during inter-MeNB handover. Of course, step 2 and step 3 further may be an enhanced SeNB adding preparation process, i.e., an SeNB adding request message is transferred in step 2 and an SeNB adding request confirmation message is transferred in the step 3. Alternatively, other newly defined message is transferred in step 2 and step 3. In the preferred embodiment, only that the SeNB modification request message is transferred in step 2 and the SeNB modification request confirmation message is transferred in step 3 is taken as an example to illustrate newly added information. However, in fact, the following manner is adopted to illustrate the newly added information: the SeNB adding request message or other newly defined message is transferred in step 2 and the SeNB adding request confirmation message or other newly defined message is transferred in step 3.

In the preferred embodiment, if the T-MeNB is required to acquire whether an X2 interface exists between the SeNB to the S-MeNB, the following manners may be adopted to determine whether an X2 interface exists between the SeNB to the S-MeNB.

Manner 1: the SeNB determines whether the X2 interface exists between the SeNB and the S-MeNB. As shown in FIG. 14, the main improvements are as follows with respect to FIG. 5.

In the step 2, the SeNB modification request message transmitted to the T-MeNB by SeNB may carry the information of the S-MeNB.

In the step 3, the SeNB determines whether the X2 interface exists between the SeNB and the S-MeNB. In the preferred embodiment, since the X2 interface exists between the T-MeNB and the SeNB, the T-MeNB may carry the following information in the SeNB modification request confirmation message: indication information indicating that the X2 interface exists between the SeNB and the S-MeNB or indication information indicating that the data forwarding can be performed directly between the SeNB and the S-MeNB In the step 4, the T-MeNB may add the forwarding address of the SeNB, acquired from the SeNB modification request confirmation message in the step 3, to the handover request confirmation message to notify to the S-MeNB.

Then, the data forwarding may be performed directly from the S-MeNB to the SeNB (i.e., S-MeNB→SeNB).

Manner 2: the SeNB determines whether the X2 interface exists between the SeNB and the S-MeNB. As shown in FIG. 15, the main improvements are as follows with respect to FIG. 5.

In the step 0, the T-MeNB notifies the information of the SeNB to the S-MeNB, such that the S-MeNB determines whether the X2 interface exists between the S-MeNB and the SeNB. The process here may be a newly defined process, and also may be a process of reusing an existing X2 interface.

In the step 1, the S-MeNB determines whether the X2 interface exists between the S-MeNB and the SeNB. In the preferred embodiment, as the X2 interface exists between the S-MeNB and the SeNB, in the handover request message, the S-MeNB may notify the following information to the T-MeNB: indication information indicating that the X2 interface exists between the S-MeNB and the SeNB, or indication information indicating that the data forwarding can be performed directly between the S-MeNB and the SeNB.

In the step 4, the T-MeNB may add the forwarding address, acquired from the SeNB modification request confirmation message in the step 3, of the SeNB to the handover request confirmation message and notify to the S-MeNB.

Then, the direct data forwarding may be performed from the S-MeNB to the SeNB (i.e., S-MeNB→SeNB).

It is to be noted that, the data forwarding optimization process in the scenario of the dual connectivity handover concerned by the preferred embodiment is completed based on the signaling interaction flowchart of FIG. 5. Other steps not mentioned in FIG. 14 to FIG. 15 may be adopted with the corresponding steps in the signaling interaction flowchart shown in FIG. 5 and will not be repeated here.

Preferred Embodiment Three

Figure 6:
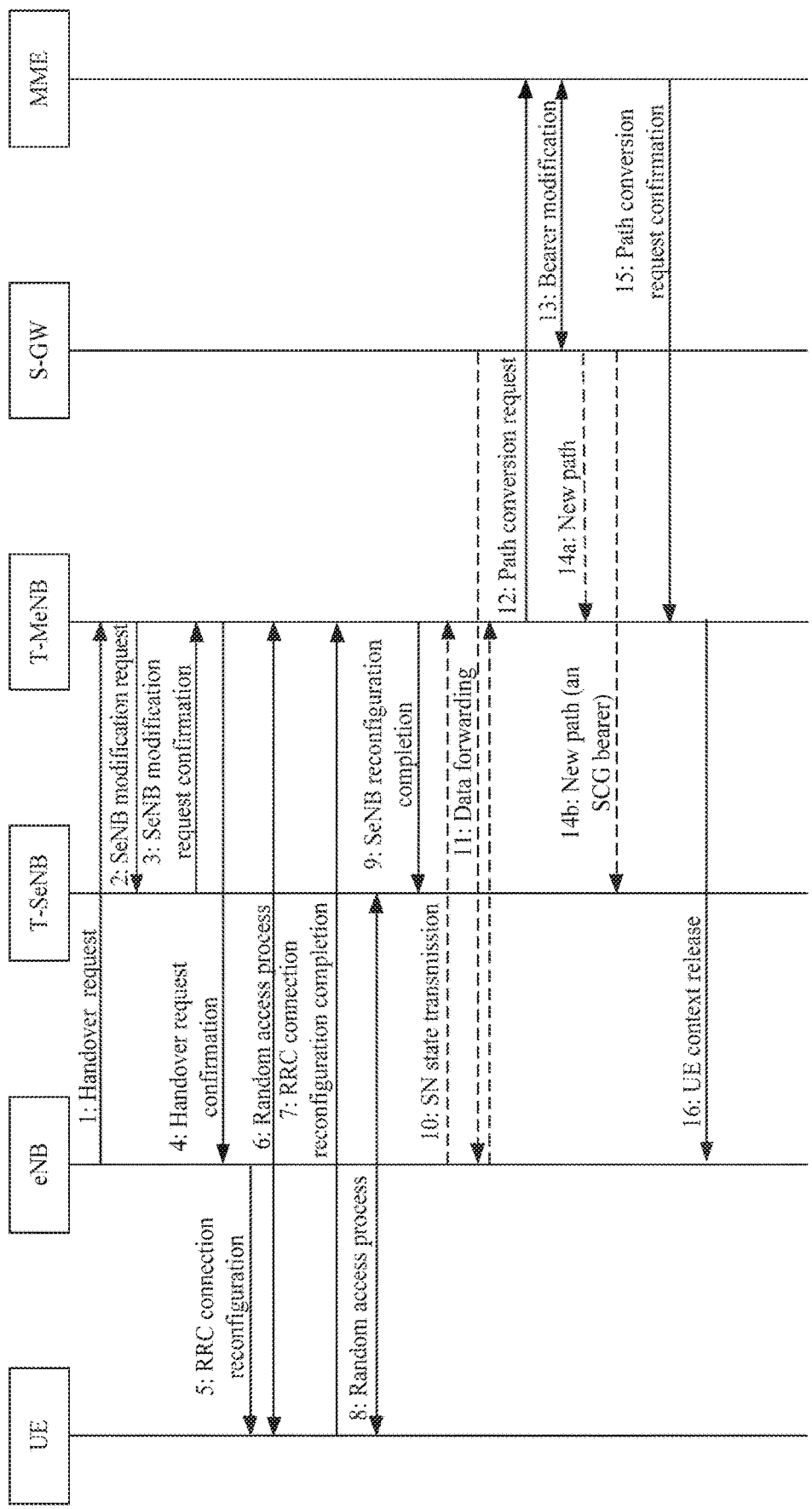
FIG. 6 is a signaling flowchart showing that an SeNB is added after a handover according to the related art.
Figure 16:
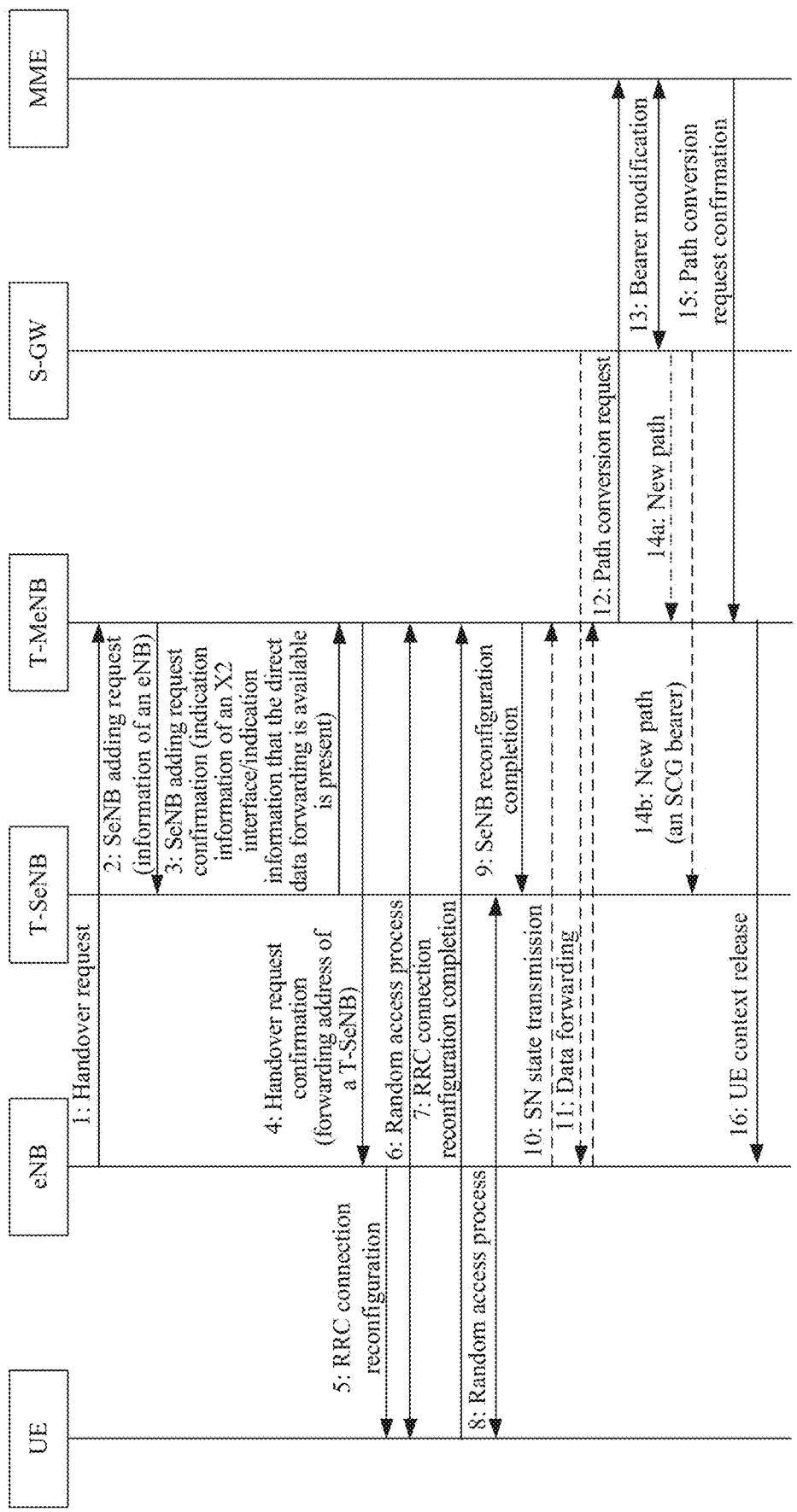
FIG. 16 is a flowchart of a process for performing data forwarding optimization based on FIG. 6 according to a preferred embodiment of the disclosure.
Figure 17:
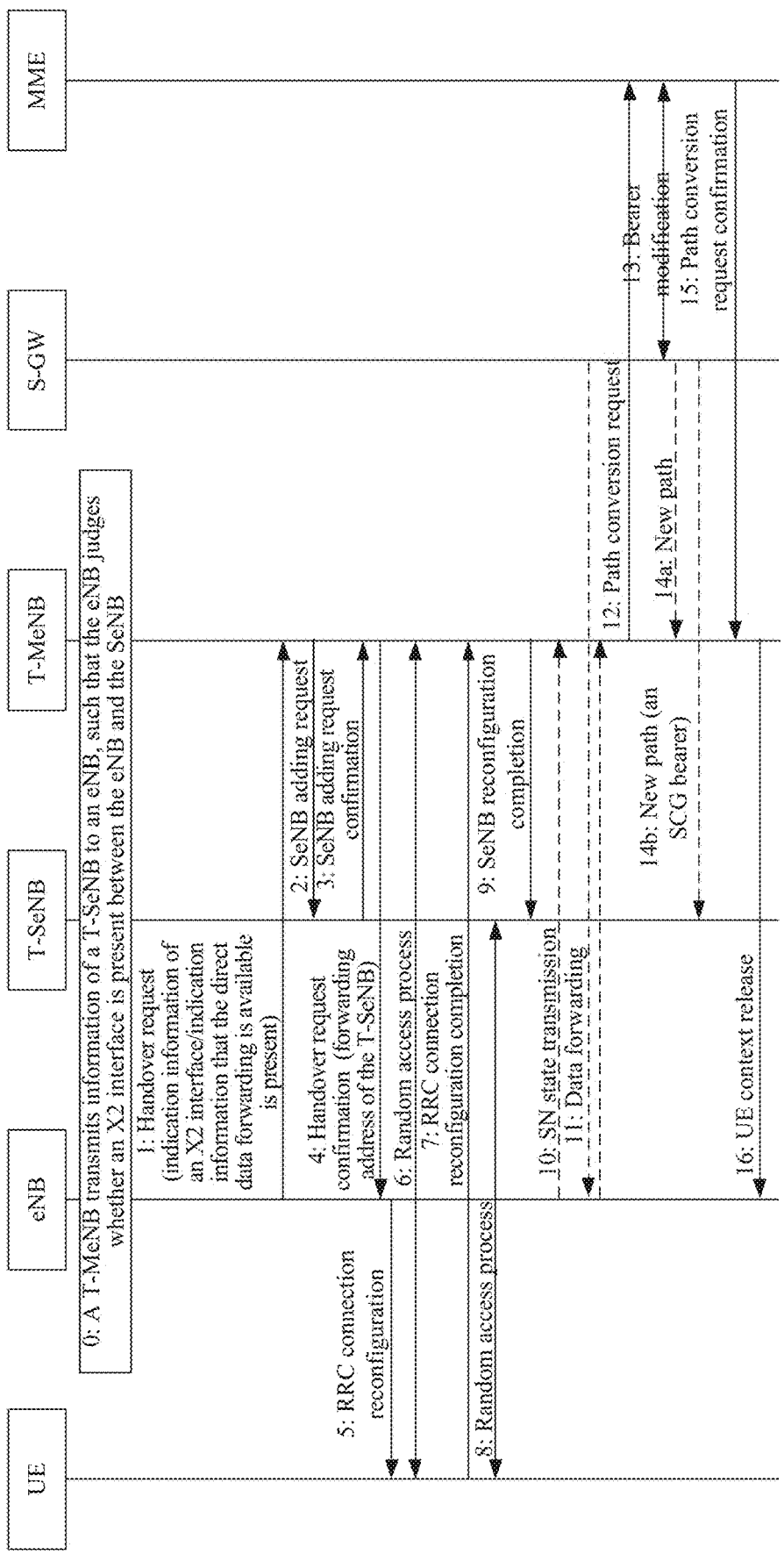
FIG. 17 is a flowchart of another process for performing data forwarding optimization based on FIG. 6 according to a preferred embodiment of the disclosure.

FIG. 16 is a flowchart of a process for performing data forwarding optimization based on FIG. 6 according to a preferred embodiment of the disclosure. FIG. 17 is a flowchart of another process for performing data forwarding optimization based on the FIG. 6 according to a preferred embodiment of the disclosure. The preferred embodiment is directed to optimizing the data forwarding, from eNB to T-SeNB (i.e., eNB→T-SeNB), in the process of adding an SeNB after handover in FIG. 6.

In the preferred embodiment, if the T-MeNB is required to acquire whether an X2 interface exists between the eNB and the T-SeNB, as shown in FIG. 11, the signaling flowchart described in FIG. 6 may be modified according to one of the following manners.

Modification manner 1: the T-SeNB determines Nether the X2 interface exists between the T-SeNB and the eNB. As shown in FIG. 16, the main improvements are as follows.

In the step 2, the SeNB adding request message transmitted to the T-SeNB by the T-MeNB carries the information of the eNB, such that the T-SeNB subsequently determines whether the X2 interface exists between the T-SeNB and the eNB.

In the step 3, the T-SeNB determines whether the X2 interface exists between the T-SeNB and the eNB. If the X2 interface exists, in the SeNB adding request confirmation message, the T-SeNB carries the indication information indicating that the X2 interface exists between the eNB and the T-SeNB, or carry the indication information indicating that the data forwarding can be performed directly.

In the step 4, the T-MeNB may add the forwarding address, acquired from the SeNB modification request confirmation message in the step 3, of the SeNB to the handover request confirmation message and notify to the eNB.

Then, the direct data forwarding may be performed from the eNB to the T-SeNB (i.e., eNB→T-SeNB).

Modification manner 2: the eNB determines whether the X2 interface exists between the eNB and the T-SeNB. As shown in FIG. 17, the main improvements are as follows. In the step 0, the T-MeNB may notify information of the T-SeNB to the eNB, such that the eNB subsequently determines whether the X2 interface exists between the eNB and the T-SeNB. The process here may be a newly defined process, and also may be a process of reusing an existing X2 interface.

In the step 1, the eNB determines whether the X2 interface exists between the eNB and the T-SeNB. If the X2 interface exists, in the handover request message, the eNB may carry the following information: indication information indicating that the X2 interface exists between the eNB and the T-SeNB, or indication information indicating that the data forwarding can be performed directly.

In the step 4, the T-MeNB may add the forwarding address, acquired from the SeNB modification request confirmation message in the step 3, of the T-SeNB to the handover request confirmation message and notify to the eNB. And then, the direct data forwarding may be performed from the eNB to the T-SeNB (i.e., eNB→T-SeNB).

It is to be noted that, the data forwarding optimization process in the scenario of the dual connectivity handover concerned by the preferred embodiment is completed based on the signaling interaction flowchart of FIG. 6. Other steps not mentioned in FIG. 16 to FIG. 17 may be adopted with the corresponding steps in the signaling interaction flowchart shown in FIG. 6 and will not be repeated here.

Preferred Embodiment Four

Figure 7:
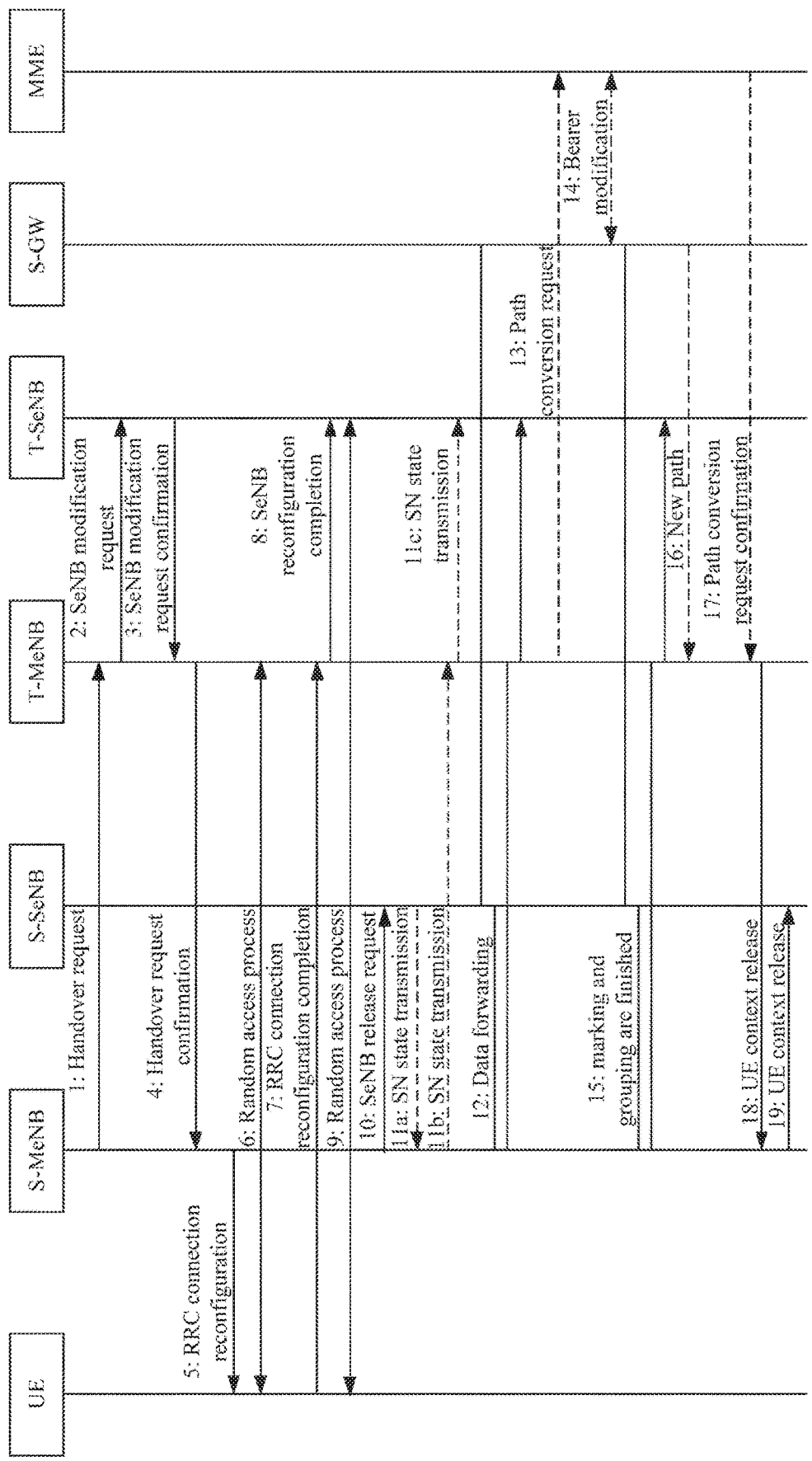
FIG. 7 is a signaling flowchart showing a process of an inter-MeNB handover and an inter-SeNB handover according to the related art.
Figure 18:
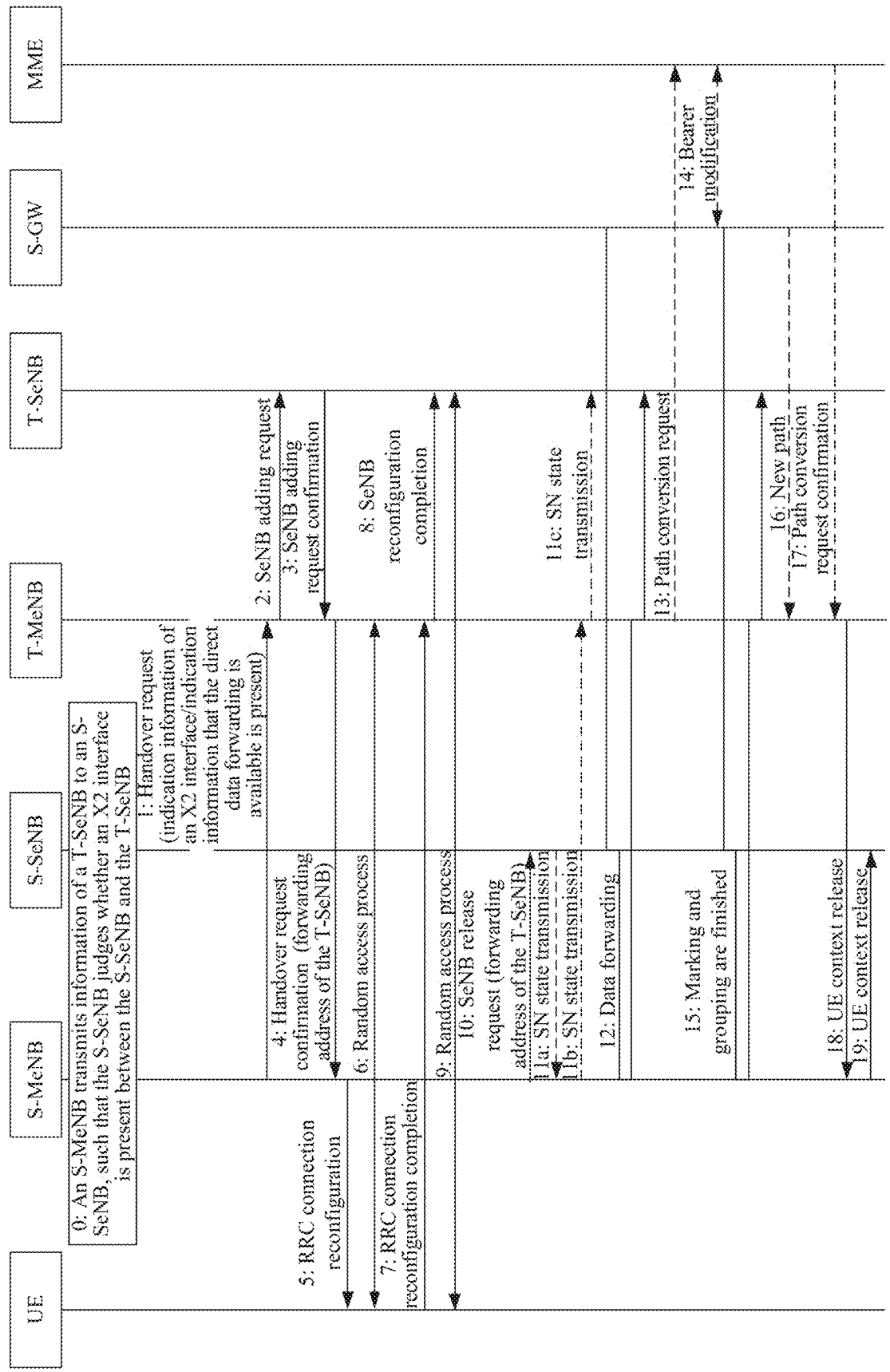
FIG. 18 is a flowchart of a process for performing data forwarding optimization based on FIG. 7 according to the first preferred embodiment of the disclosure.
Figure 19:
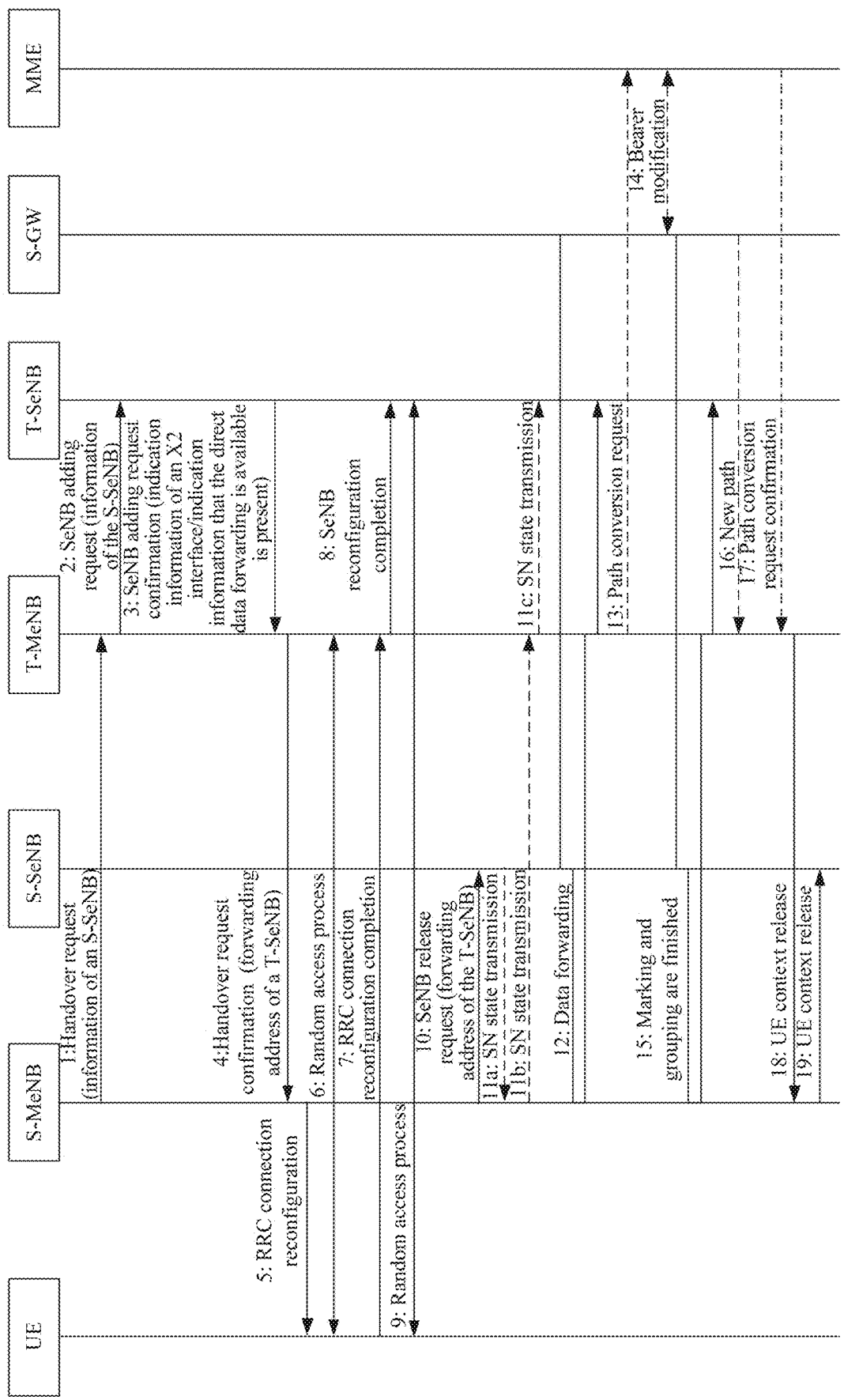
FIG. 19 is a flowchart of another process for performing data forwarding optimization based on FIG. 7 according to the first preferred embodiment of the disclosure.

FIG. 18 is a flowchart of a process for performing data forwarding optimization based on FIG. 7 according to a first preferred embodiment of the disclosure. FIG. 19 is a flowchart of another process for performing data forwarding optimization based on FIG. 7 according to a first preferred embodiment of the disclosure. The preferred embodiment is directed to optimizing the data forwarding, from an S-SeNB to a T-SeNB (i.e., S-SeNB→T-SeNB), during inter-MeNB handover together with inter-SeNB handover.

In the preferred embodiment, if the S-MeNB is required to acquire whether an X2 interface exists between the S-SeNB and the T-SeNB, the signaling flowchart described in FIG. 7 may be modified according to one of the following manners.

Modification manner 1: the S-SeNB determines whether the X2 interface exists between the S-SeNB and the T-SeNB. As shown in FIG. 18, the main improvements are as follows.

In step 0, the S-MeNB may notify information of the T-SeNB to the S-SeNB, such that S-SeNB subsequently determines whether the X2 interface exists between the S-SeNB and the T-SeNB. The process here may be a newly defined process, and also may be a process of reusing an existing X2 interface.

In the step 1, the S-SeNB determines whether the X2 interface exists between the S-SeNB and the T-SeNB. If the X2 interface exists, in the handover request message, the S-MeNB may carry the following information: indication information indicating that the X2 interface exists between the S-SeNB and the T-SeNB, or indication information indicating that the data forwarding can be performed directly between the S-SeNB and the T-SeNB.

In the step 4, the T-MeNB may transmit the forwarding address, acquired from the SeNB adding request confirmation message in the step 3, of the T-MeNB to the S-MeNB in the handover request confirmation message.

In the step 10, the S-SeNB may transmit the forwarding address, acquired from the handover request confirmation message in the step 4, of the T-SeNB to the S-SeNB in the SeNB release request message.

Then, the direct data forwarding may be performed from the S-SeNB to the T-SeNB (i.e., S-SeNB→T-SeNB).

Modification manner 2: the T-SeNB determines whether the X2 interface exists between the T-SeNB and the S-SeNB. As shown in FIG. 19, the main improvements are as follows.

In the step 1, the S-MeNB may carry information of the S-SeNB in the handover request message, such that the T-SeNB subsequently determines whether the X2 interface exists between the T-SeNB and the S-MeNB.

In the step 2, the T-MeNB may carry the information of the S-SeNB acquired from the handover request message in the step 1 in the SeNB adding request message, such that the T-SeNB subsequently determines whether the X2 interface exists between the T-SeNB and the S-SeNB.

In the step 3, the T-SeNB determines whether the X2 interface exists between the T-SeNB and the S-SeNB. If the X2 interface exists, in the SeNB adding request confirmation message, the T-SeNB carries the following information: indication information indicating that the X2 interface exists between the S-SeNB and the T-SeNB, or indication information indicating that the data forwarding can be performed directly between the S-SeNB and the T-SeNB.

In the step 4, the T-MeNB transmits the forwarding address, acquired from the SeNB adding request confirmation message in the step 3, of the T-SeNB in the handover request confirmation message to the S-MeNB.

In the step 10, the S-SeNB may transmit the forwarding address, acquired from the handover request confirmation message in the step 4, of the T-SeNB in the SeNB release request message to the SeNB.

Then, the direct data forwarding may be performed from the S-SeNB to the T-SeNB (i.e., S-SeNB→T-SeNB).

It is to be noted that, the data forwarding optimization process in the scenario of the dual connectivity handover concerned by the preferred embodiment is completed based on the signaling interaction flowchart of FIG. 7. Other steps not mentioned in FIG. 18 to FIG. 19 may be adopted with the corresponding steps in the signaling interaction flowchart shown in FIG. 7 and will not be repeated here.

Preferred Embodiment Five

Figure 20:
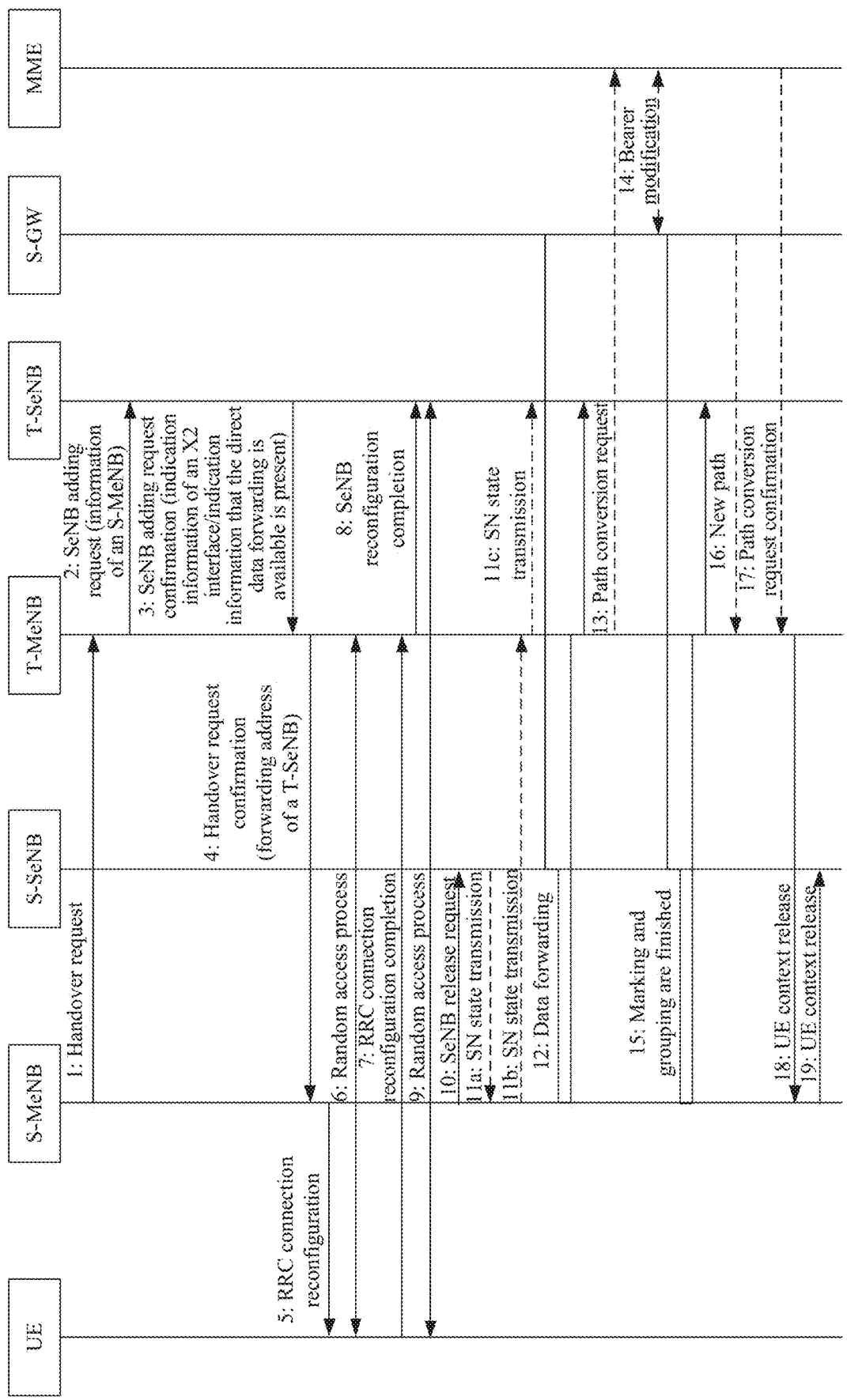
FIG. 20 is a flowchart of a process for performing data forwarding optimization based on FIG. 7 according to the second preferred embodiment of the disclosure.
Figure 21:
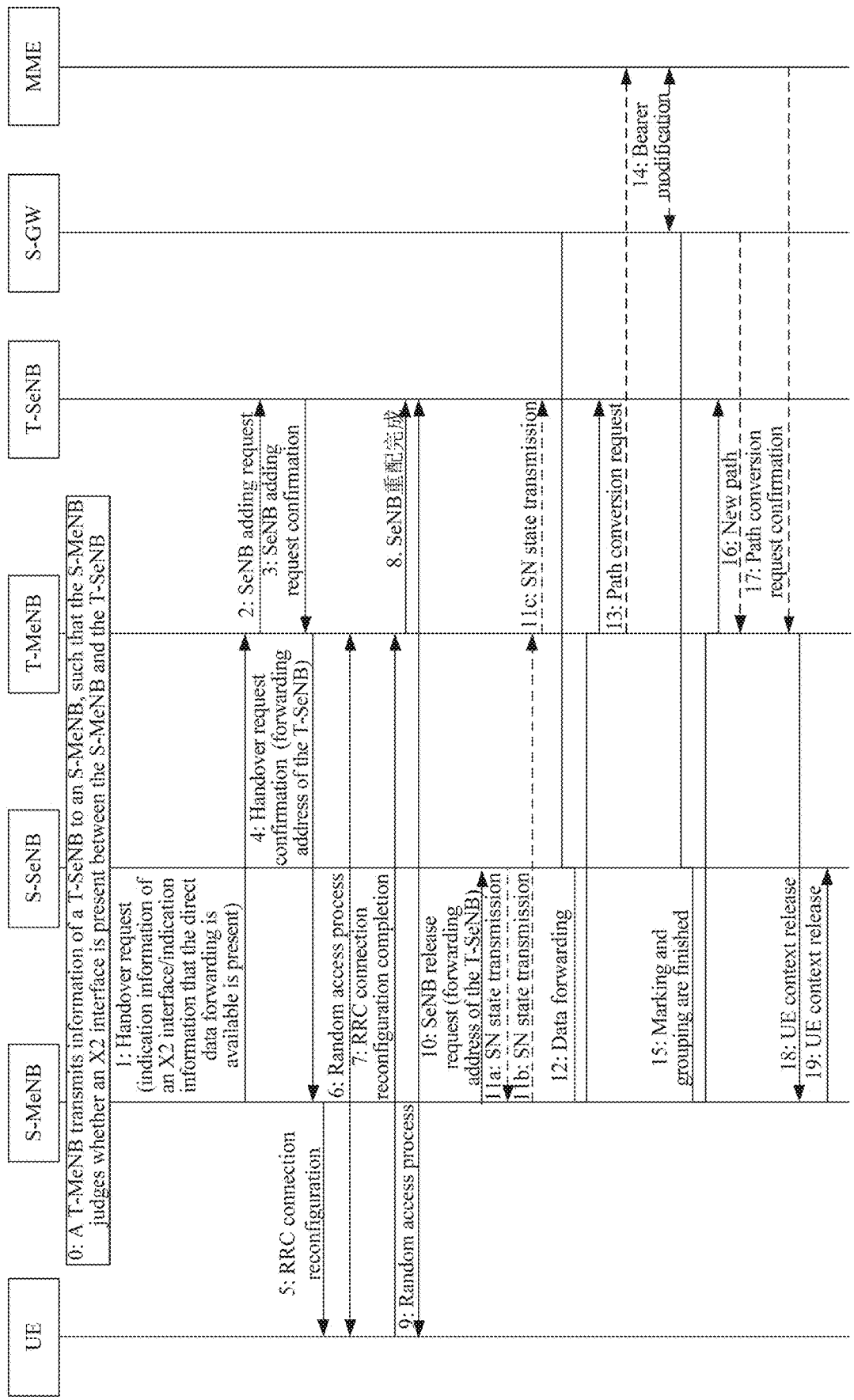
FIG. 21 is a flowchart of another process for performing data forwarding optimization based on FIG. 7 according to the second preferred embodiment of the disclosure.

FIG. 20 is a flowchart of a process for performing data forwarding optimization based on FIG. 7 according to a second preferred embodiment of the disclosure. FIG. 21 is a flowchart of another process for performing data forwarding optimization based on FIG. 7 according to a second preferred embodiment of the disclosure. The preferred embodiment is directed to optimize the data forwarding, at first performed from an S-SeNB to an S-MeNB and then performed from the S-MeNB to a T-SeNB (i.e., S-SeNB→S-MeNB→T-SeNB), during inter-MeNB handover together with the inter-SeNB handover in FIG. 7. In addition, the preferred embodiment also is directed to optimize the data forwarding, from the S-MeNB to the T-SeNB (i.e., S-MeNB→T-SeNB), during inter-MeNB handover together with the inter-SeNB handover in FIG. 7.

In the preferred embodiment, if the T-MeNB is required to acquire whether an X2 interface exists between the S-MeNB and the T-SeNB, the signaling flowchart described in FIG. 7 may be modified according to one of the following manners.

Modification manner 1: the T-SeNB determines whether the X2 interface exists between the T-SeNB and the S-MeNB. As shown in FIG. 20, the main improvements are as follows.

In the step 2, the T-MeNB may carry information of the S-MeNB in the SeNB adding request message, such that the T-SeNB subsequently determines whether the X2 interface exists between the T-SeNB and the S-MeNB.

In the step 3, the T-SeNB determines whether the X2 interface exists between the T-SeNB and the S-MeNB. If the X2 interface exists, in the SeNB adding request confirmation message, the T-SeNB may carry the following information: indication information indicating that the X2 interface exists between the S-MeNB and the T-SeNB, or indication information indicating that the data forwarding can be performed directly between the S-MeNB and the T-SeNB.

In the step 4, the T-MeNB may transmit the forwarding address, acquired from the SeNB adding request confirmation message in the step 3, of the T-SeNB in the handover request confirmation message to the S-MeNB.

Then, the direct data forwarding may be performed from the S-MeNB to the T-SeNB (i.e., S-SeNB→T-SeNB).

Modification manner 2: the S-MeNB determines whether the X2 interface exists between the S-MeNB and the T-SeNB. As shown in FIG. 21, the main improvements are as follows.

In the step 0, the T-MeNB may notify information of the T-SeNB to the S-MeNB, such that the S-MeNB subsequently determines whether the X2 interface exists between the S-MeNB and the T-SeNB. The process here may be a newly defined process, and also may be a process of reusing an existing X2 interface.

In the step 1, the S-MeNB determines whether the X2 interface exists between the S-MeNB and the T-SeNB. If the X2 interface exists, the S-MeNB may carry the following information in the handover request message to notify the T-MeNB: indication information indicating that the X2 interface exists between the S-MeNB and the T-SeNB, or indication information indicating that the data forwarding can be performed directly between the S-MeNB and the T-SeNB.

In the step 4, the T-MeNB may transmit the forwarding address, acquired from the SeNB adding request confirmation message in the step 3, of the T-SeNB in the handover request confirmation message to the S-MeNB.

Then, the direct data forwarding may be performed from the S-MeNB to the T-SeNB (i.e., S-SeNB→T-SeNB).

It is to be noted that, the data forwarding optimization process in the scenario of the dual connectivity handover concerned by the preferred embodiment is completed based on the signaling interaction flowchart of FIG. 7. Other steps not mentioned in FIG. 20 to FIG. 21 may be adopted with the corresponding steps in the signaling interaction flowchart shown in FIG. 7 and will not be repeated here.

Preferred Embodiment Six

Figure 22:
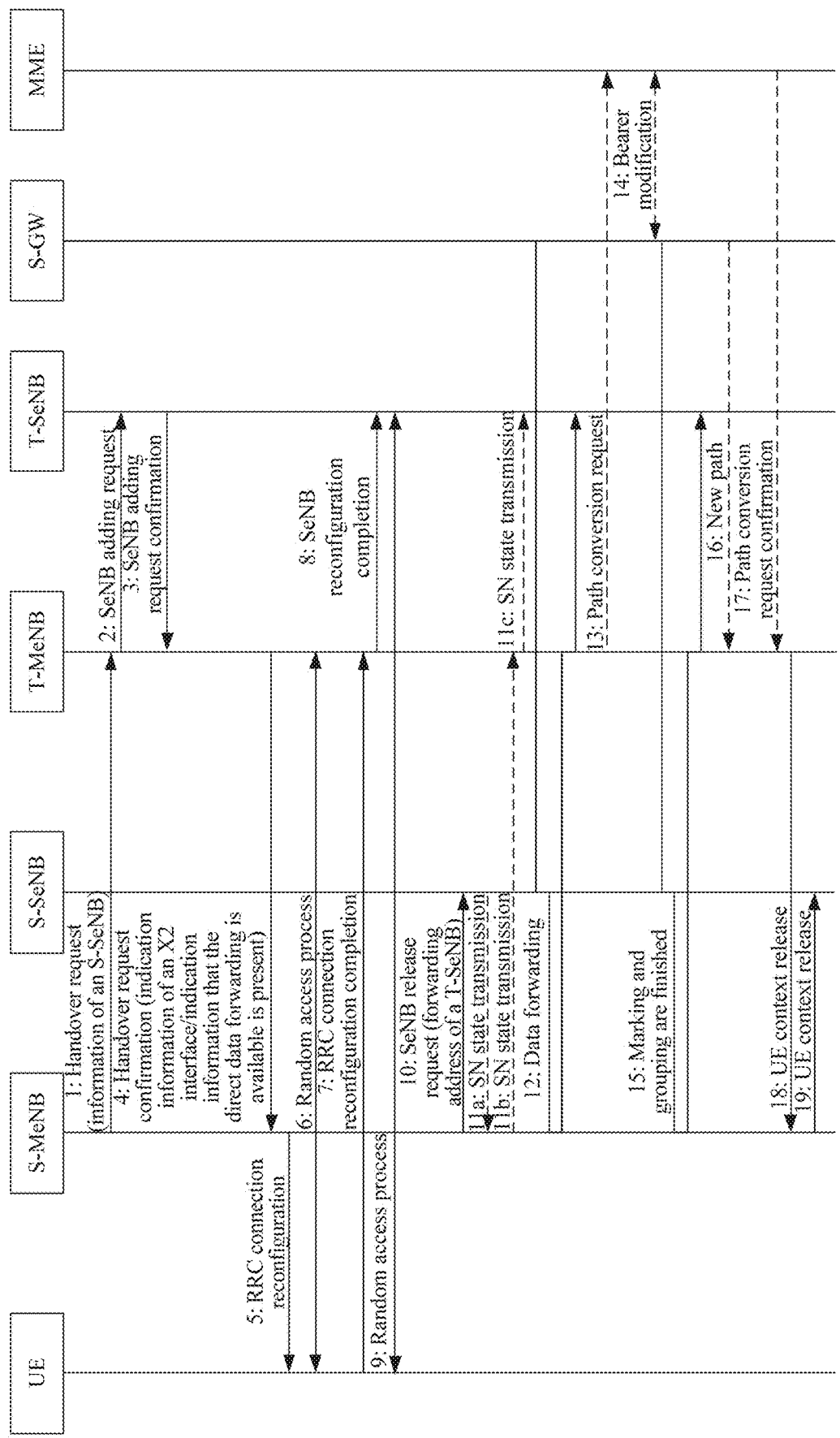
FIG. 22 is a flowchart of a process for performing data forwarding optimization based on FIG. 7 according to a third preferred embodiment of the disclosure.
Figure 23:
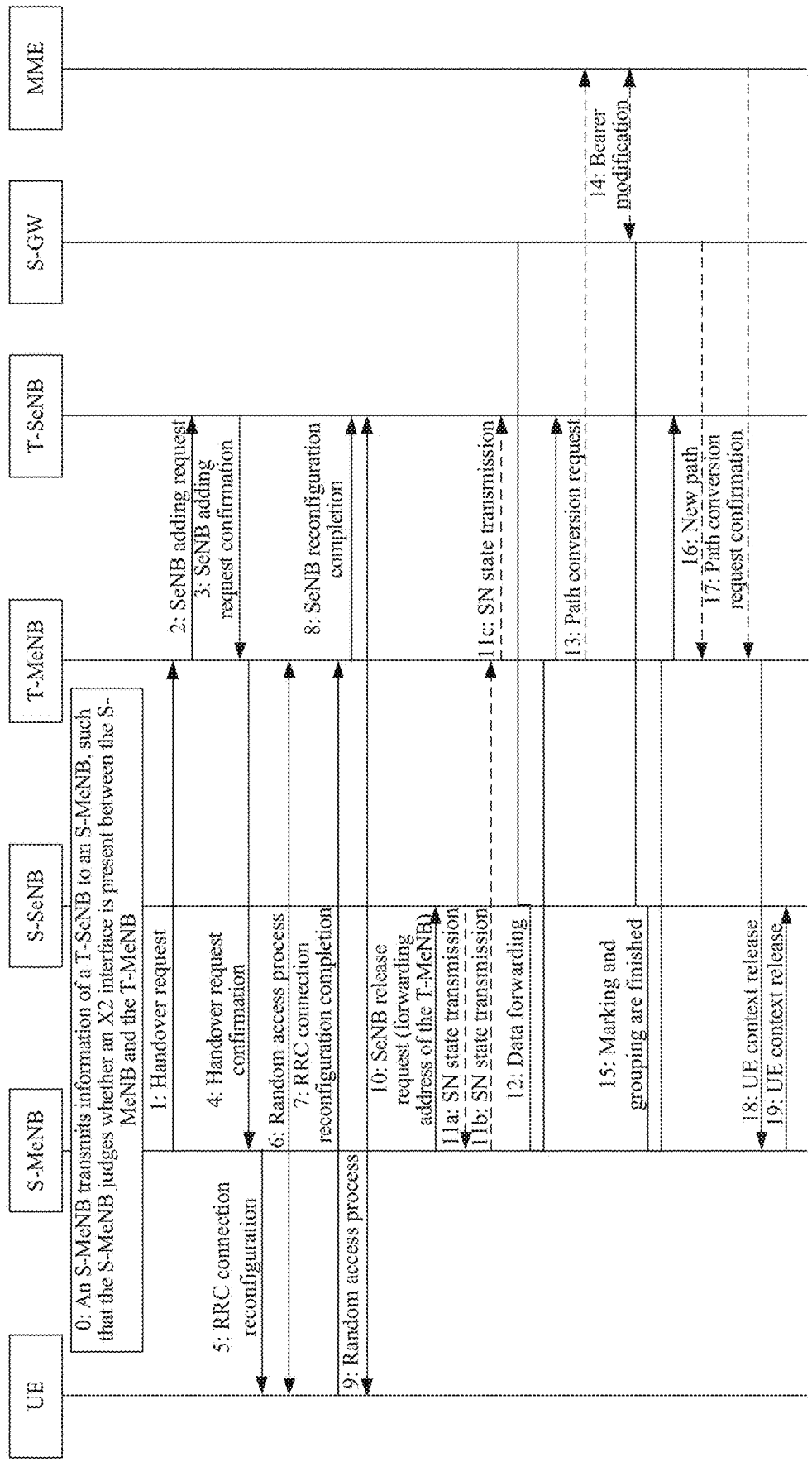
FIG. 23 is a flowchart of another process for performing data forwarding optimization based on FIG. 7 according to the third preferred embodiment of the disclosure.

FIG. 22 is a flowchart of a process for performing data forwarding optimization based on FIG. 7 according to a third preferred embodiment of the disclosure. FIG. 23 is a flowchart of a process for performing data forwarding optimization based on FIG. 7 according to a third preferred embodiment of the disclosure. The preferred embodiment is directed to optimizing the data forwarding, at first performed from an S-SeNB to a T-MeNB and then performed from the T-MeNB to a T-SeNB (i.e., S-SeNB→T-MeNB→T-SeNB), during inter-MeNB handover together with the inter-SeNB handover in FIG. 7. In addition, the preferred embodiment also is directed to optimizing the data forwarding, during inter-MeNB handover together with the inter-SeNB handover in FIG. 7 and is performed from the S-MeNB to the T-MeNB (i.e., S-MeNB→T-MeNB).

In the preferred embodiment, if the S-MeNB is required to acquire whether an X2 interface exists between the S-SeNB and the T-MeNB, the signaling flowchart described in FIG. 7 may be modified according to one of the following manners.

Modification manner 1: the T-MeNB determines whether the X2 interface exists between the T-MeNB and the S-SeNB. As shown in FIG. 22, the main improvements are as follows.

In the step 1, the S-MeNB carries information of the S-SeNB in the handover request message, such that the T-MeNB subsequently determines whether the X2 interface exists between the T-MeNB and the S-SeNB.

In the step 4, the T-MeNB determines whether the X2 interface exists between the T-MeNB and the S-MeNB. If the X2 interface exists, in the handover request confirmation message, the T-MeNB may carry the following information: indication information indicating that the X2 interface exists between the S-SeNB and the T-MeNB, or indication information indicating that data forwarding can be performed directly between the S-SeNB and the T-MeNB.

In the step 10, the S-MeNB may transmit the forwarding address of the T-MeNB, acquired from the handover request confirmation message in the step 4, in the SeNB release request message to the S-SeNB.

Then, the direct data forwarding may be performed from the S-SeNB to the T-MeNB (i.e., S-SeNB→T-MeNB).

Modification manner 2: the S-SeNB determines whether the X2 interface exists between the S-SeNB and the T-MeNB. As shown in FIG. 23, the main improvements are as follows.

In the step 0, the S-MeNB may notify information of the T-MeNB to the S-SeNB, such that the S-SeNB subsequently determines whether the X2 interface exists between the S-SeNB and the T-MeNB. If the X2 interface exists, the S-SeNB may notify the following information to the S-MeNB: indication information indicating that the X2 interface exists between the T-MeNB to the S-SeNB, or indication information indicating that data forwarding can be performed directly between the T-MeNB to the S-SeNB. The process here may be a newly defined process.

In the step 10, the S-MeNB may transmit the forwarding address of the T-MeNB, acquired from the handover request confirmation message in the step 4, in the SeNB release request message to the S-SeNB.

Then, the data forwarding may be performed directly from the S-SeNB to the T-MeNB (i.e., S-SeNB→T-MeNB).

It is to be noted that, the data forwarding optimization process in the scenario of the dual connectivity handover concerned by the preferred embodiment is completed based on the signaling interaction flowchart of FIG. 7. Other steps not mentioned in FIG. 22 to FIG. 23 may be adopted with the corresponding steps in the signaling interaction flowchart shown in FIG. 7 and will not be repeated here.

Through the above description of the embodiments, those skilled in the art may clearly understand that the disclosure may be implemented by software and a necessary universal hardware platform according to the methods of the embodiments, and of course, also may be implemented by hardware, but in most cases, the former is a preferable implementation manner. Based on such an understanding, the technical solutions of the disclosure substantially or a part with contributions to the related art may be embodied in form of a software product, and the computer software product is stored in a storage medium (such as a Read-Only Memory (ROM)/Random-Access Memory (RAM), a disk and a compact disk), including a plurality of instructions arranged to enable a terminal device (which may be a mobile phone, a computer, a server, a network device or the like) to execute the method in each embodiment of the disclosure.

A data transmission device is further provided in the embodiments. The device is configured to implement the above-mentioned embodiments and the preferred implementation manners; and with regard to the part that has been described, no further description is needed. As used in the followings, terms "module" can achieve a combination of software and/or hardware with predetermined functions. Although the device described by the following embodiments is preferably implemented by the software, it may also be contemplated to be implemented by the hardware or the combination of the software and the hardware.

FIG. 24 is a structure block diagram of a data transmission device according to an embodiment of the disclosure. As shown in FIG. 24, the data transmission method is applied to a first node. The data transmission device may include: a transmission module 10, configured to directly transmit a forwarding address of the first node to a second node in a condition of acquiring an X2 interface exists between the first node and the second node.

In a preferred implementation process, the forwarding address may include but not limited to: GPRS tunneling protocol information forwarded by uplink data and GPRS tunneling protocol information forwarded by downlink data; the GPRS tunneling protocol includes: a transmission layer address and a GPRS TEID.

Preferably, the transmission module 10 is configured to transmit the forwarding address of the first node to the second node using one of the following manners, Manner 1: the first node transmits the forwarding address of the first node to the second node in an SeNB modification request message.

Manner 2: the first node transmits the forwarding address of the first node to the second node in an SeNB adding message.

Manner 3: the first node transmits the forwarding address of the first node to the second node in an SeNB reconfiguration completion message.

Manner 4: the first node transmits the forwarding address of the first node to the second node in a pre-defined new message.

Preferably, in a condition that the second node acquires the forwarding address of the first node, data forwarding is performed directly from the second node to the first node.

In a preferred implementation process, the first node is a T-MeNB during inter-MeNB handover with the SeNB unchanged; the second node is an SeNB during inter-MeNB handover with the SeNB unchanged.

FIG. 25 is a structure block diagram of another data transmission device according to an embodiment of the disclosure. As shown in FIG. 25, the data transmission device is applied to a third node. The data transmission device may include: a notification module 20, configured to notify information of a first node to a second node in a case that whether an X2 interface exists between the first node and the second node is required to be determined, such that the second node determines whether the X2 interface exists between the second node and the first node; or notify information of a second node to a first node, such that the first node determines whether the X2 interface exists between the first node and the second node; a receiving module 30, configured to receive indication information from the second node or the first node, wherein the indication information is used to indicate that the X2 interface exists between the second node and the first node or the indication information is used to indicate that a direct-forwarding path is available; and a transmission module 40, configured to transmit a forwarding address of the second node to the first node, or transmit a forwarding address of the first node to the second node.

In a preferred implementation process, the forwarding address may include but not limited to: GPRS tunneling protocol information forwarded by uplink data and GPRS tunneling protocol information forwarded by downlink data; the GPRS tunneling protocol includes: a transmission layer address and a GPRS TEID.

Preferably, the notification module 20 is configured to notify the information of the first node to the second node in an X2 handover request message. The receiving module 30 is configured to receive an X2 handover request confirmation message from the second node, wherein the X2 handover request confirmation message carries the indication information. The transmission module 40 is configured to transmit the forwarding address of the second node to the first node in an SeNB release request message.

Preferably, after the first node acquires the forwarding address of the second node, data forwarding is performed directly from the first node to the second node.

Preferably, the notification module 20 is configured to notify the information of the second node to the first node in a newly defined message or an existing dual connectivity message. The receiving module 30 is configured to receive a confirmation message of the newly defined message or a confirmation message of the dual connectivity message from the first node, wherein the confirmation message of the newly defined message or the confirmation message of the dual connectivity message carries the indication information. The transmission module 40 is configured to transmit the forwarding address of the second node to the first node in an SeNB release request message.

Preferably, after the first node acquires the forwarding address of the second node, data forwarding is performed directly from the first node to the second node.

Preferably, the notification module 20 is configured to notify the information of the second node to the first node in an SeNB modification request message or an SeNB adding request message or a newly defined message. The receiving module 30 is configured to receive an SeNB modification request confirmation information or an SeNB adding request confirmation message or a newly defined confirmation message from the first node, wherein the SeNB modification request confirmation information or the SeNB adding request confirmation message or the newly defined confirmation message carries the indication information. The transmission module 40 is configured to transmit the forwarding address of the first node to the second node in an X2 handover request confirmation message.

Preferably, after the second node acquires the forwarding address of the first node, data forwarding is performed directly from the second node to the first node.

Preferably, the notification module 20 is configured to notify the information of the first node to the second node in a newly defined message or an existing X2 message. The receiving module 30 is configured to receive an X2 handover request message from the second node, wherein the X2 handover request message carries the indication information. The transmission module 40 is configured to transmit the forwarding address of the first node to the second node in an X2 handover request confirmation message.

Preferably, after the second node acquires the forwarding address of the first node, data forwarding is performed directly from the second node to the first node.

Preferably, the notification module 20 is configured to notify the information of the second node to the first node in an SeNB adding request message. The receiving module 30 is configured to receive an SeNB adding request confirmation message from the first node, wherein the SeNB adding request confirmation message carries the indication information. The transmission module 40 is configured to transmit the forwarding address of the first node to the second node in an X2 handover request confirmation message.

Preferably, after the second node acquires the forwarding address of the first node, data forwarding is performed directly from the second node to the first node.

Preferably, the notification module 20 is configured to notify the information of the first node to the second node in a newly defined message or an existing X2 message. The receiving module 30 is configured to receive an X2 handover request message from the second node, wherein the X2 handover request message carries the indication information. The transmission module 40 is configured to transmit the forwarding address of the first node to the second node in an X2 handover request confirmation message.

Preferably, after the second node acquires the forwarding address of the first node, data forwarding is performed directly from the second node to the first node.

Preferably, the notification module 20 is configured to notify the information of the second node to the first node in an SeNB adding request message. The receiving module 30 is configured to receive an SeNB adding request confirmation message from the first node, wherein the SeNB adding request confirmation message carries the indication information. The transmission module 40 is configured to transmit the forwarding address of the first node to the second node in a handover request confirmation message.

Preferably, after the second node acquires the forwarding address of the first node, data forwarding is performed directly from the second node to the first node.

Preferably, the notification module 20 is configured to notify the information of the first node to the second node in a newly defined message or an existing X2 message. The receiving module 30 is configured to receive an X2 handover request message from the second node, wherein the X2 handover request message carries the indication information. The transmission module 40 is configured to transmit the forwarding address of the first node to the second node in an X2 handover request confirmation message.

Preferably, after the second node acquires the forwarding address of the first node, data forwarding is performed directly from the second node to the first node.

Preferably, the notification module 20 is configured to notify the information of the first node to the second node in an X2 handover request message. The receiving module 30 is configured to receive an X2 handover request confirmation message from the second node, wherein the X2 handover request confirmation message carries the indication information. The transmission module 40 is configured to transmit the forwarding address of the first node to the second node in an SeNB release request message.

Preferably, after the first node acquires the forwarding address of the second node, data forwarding is performed directly from the first node to the second node.

Preferably, the notification module 20 is configured to notify the information of the second node to the first node in a newly defined message or an existing dual connectivity message. The receiving module 30 is configured to receive a confirmation message of the newly defined message or a confirmation message of the dual connectivity message from the first node, wherein the confirmation message of the newly defined message or the confirmation message of the dual connectivity message carries the indication information. The transmission module 40 is configured to transmit the forwarding address of the second node to the first node in an SeNB release request message.

Preferably, after the first node acquires the forwarding address of the second node, data forwarding is performed directly from the first node to the second node.

In a preferred implementation process, network entities to which the first node, the second node and the third node are respectively belonged may be flexibly determined according to an actual application scenario and specifically are as follows:

(1) the first node is an SeNB during inter-MeNB handover with the SeNB unchanged, the second node is a T-MeNB during inter-MeNB handover with the SeNB unchanged and the third node is an S-MeNB during inter-MeNB handover with the SeNB unchanged; or, (2) the first node is the SeNB during inter-MeNB handover with the SeNB unchanged, the second node is the S-MeNB during inter-MeNB handover with the SeNB unchanged and the third node is the T-MeNB during inter-MeNB handover with the SeNB unchanged; or, (3) the first node is a T-SeNB in a process of adding an SeNB after handover, the second node is an eNB in the process of adding the SeNB after handover and the third node is a T-MeNB in the process of adding the SeNB after handover; or, (4) the first node is a T-SeNB during inter-MeNB handover together with the inter-SeNB handover, the second node is an S-MeNB during inter-MeNB handover together with the inter-SeNB handover and the third node is a T-MeNB during inter-MeNB handover together with the inter-SeNB handover; or, (5) the first node is an S-SeNB during inter-MeNB handover together with the inter-SeNB handover, the second node is the T-MeNB during inter-MeNB handover together with the inter-SeNB handover and the third node is the S-MeNB during inter-MeNB handover together with the inter-SeNB handover.

FIG. 26 is a structure block diagram of another data transmission device according to an embodiment of the disclosure. As shown in FIG. 26, the data transmission device is applied to a third node. The data transmission device may include: a notification module 50, configured to notify information of a first node to a second node in a condition that whether an X2 interface exists between the first node and the second node is required to be determined, such that the second node determines whether the X2 interface exists between the second node and the first node; or notify information of a second node to a first node, such that the first node determines whether the X2 interface exists between the first node and the second node; a receiving module 60, configured to receive a forwarding address of the second node or a forwarding address of the first node from a fourth node, wherein the forwarding address of the second node or the forwarding address of the first node are transmitted after the fourth node acquires indication information, and the indication information is used to indicate that the X2 interface exists between the second node and the first node or the indication information is used to indicate a direct-forwarding path is available; and a transmission module 70, configured to transmit a forwarding address of the second node to the first node, or transmit a forwarding address of the first node to the second node.

In a preferred implementation process, the forwarding address may include but not limited to: GPRS tunneling protocol information forwarded by uplink data and GPRS tunneling protocol information forwarded by downlink data; the GPRS tunneling protocol includes: a transmission layer address and a GPRS TEID.

Preferably, the notification module 50 is configured to notify the information of the first node to the fourth node in an X2 handover request message, and notify the information of the first node to the second node via an SeNB adding request message by the fourth node. The receiving module 60 is configured to receive the forwarding address of the second node from the fourth node, which includes: the fourth node receives an SeNB adding request confirmation message from the second node, wherein the SeNB adding request confirmation message carries the indication information; the fourth node transmits the forwarding address of the second node to the third node in an X2 handover request confirmation message. The transmission module 70 is configured to transmit the forwarding address of the second node to the first node in an SeNB release request message.

Preferably, after the first node acquires the forwarding address of the second node, data forwarding is performed directly from the first node to the second node.

Preferably, the notification module 50 is configured to notify the information of the second node to the first node in a newly defined message or an existing dual connectivity message. The receiving module 60 is configured to receive a newly defined confirmation message or an existing dual connectivity confirmation message from the first node, wherein the newly defined confirmation message or the existing dual connectivity confirmation message carries the indication information; transmit the indication information to the fourth node in an X2 handover request message; and receive an X2 handover request confirmation message from the fourth node, wherein the X2 handover request confirmation message carries the forwarding address of the second node. The transmission module 70 is configured to transmit the forwarding address of the second node to the first node in an SeNB release request message.

Preferably, after the first node acquires the forwarding address of the second node, data forwarding is performed directly from the first node to the second node.

In a preferable implementation process, the first node is an S-SeNB during the inter-MeNB handover together with the inter-SeNB handover, the second node is a T-SeNB during inter-MeNB handover together with the inter-SeNB handover, the third node is an S-MeNB during inter-MeNB handover together with the inter-SeNB handover and the fourth node is a T-MeNB during inter-MeNB handover together with the inter-SeNB handover.

It is to be noted that the above each module may be implemented by software or hardware. For the later, it may be implemented by the following ways, but is not limited to this: the above modules all are positioned in a same processor; alternatively, the above modules are respectively positioned in a plurality of processors.

Apparently, those skilled in the art should understand that various modules or steps of the disclosure described above may be implemented by general-purpose computing devices that may be centralized on a single computing device or distributed over a network consisting of a plurality of computing devices. Operationally, the modules or steps may be implemented by program codes executable by the computing devices such that they may be stored in storage devices and executed by the computing devices. Moreover, in some cases, the steps shown or described may be performed in an order different from that shown herein. Or the modules or steps can be made separately into individual integrated circuit modules, or some of them can be made into a single integrated circuit element. Thus, the disclosure is not limited to any particular combination of hardware and software.

The above description is only preferred embodiments of the disclosure and is not intended to limit the disclosure. Those skilled in the art should understand that the disclosure may have various changes and modifications. Any modification, equivalent substitution, improvement and the like made within the spirit and principle of the disclosure should be included in the protection scope of the disclosure.

INDUSTRIAL APPLICABILITY

As the above, the data transmission method and device provided by the embodiments of the disclosure have the following beneficial effects: the optimization on the data forwarding in the scenario of the dual connectivity handover is implemented, thereby improving the flexibility and the applicability of the data forwarding.

The invention claimed is:

1. A data transmission method, comprising:
in a condition that a third node is required to acquire whether an X2 interface exists between a first node and a second node, notifying, by the third node, information of the first node to the second node, so as to enable the second node to determine whether the X2 interface exists between the second node and the first node; or notifying, by the third node, information of the second node to the first node, so as to enable the first node to determine whether the X2 interface exists between the first node and the second node;
receiving, by the third node, indication information from the second node or the first node, wherein the indication information is used to indicate that the X2 interface exists between the second node and the first node or the indication information is used to indicate that a direct-forwarding path is available; and
transmitting, by the third node, a forwarding address of the second node to the first node, or transmitting, by the third node, a forwarding address of the first node to the second node;
wherein notifying, by the third node, the information of the second node to the first node comprises: notifying, by the third node, the information of the second node to the first node in a newly defined message or an existing dual connectivity message; and
notifying, by the third node, the information of the first node to the second node comprises: notifying, by the third node, the information of the first node to the second node in a newly defined message or an existing X2 message; wherein
after notifying, by the third node, the information of the second node to the first node in the newly defined message or the existing dual connectivity message;
the receiving, by the third node, the indication information from the first node comprises: receiving, by the third node, a confirmation message of the newly defined message or a confirmation message of the existing dual connectivity message from the first node, wherein the confirmation message of the newly defined message or the confirmation message of the dual connectivity message carries the indication information; and
the transmitting, by the third node, the forwarding address of the second node to the first node comprises: transmitting, by the third node, the forwarding address of the second node to the first node in an SeNB release request message.

2. The method according to claim 1, wherein after the transmitting, by the third node, the forwarding address of the second node to the first node, the method further comprises:
after the first node acquires the forwarding address of the second node, performing data forwarding directly from the first node to the second node.

3. The method according to claim 1, wherein the first node is an SeNB during inter-MeNB handover with the SeNB unchanged, the second node is a T-MeNB during inter-MeNB handover with the SeNB unchanged and the third node is a Source MeNB (S-MeNB) during inter-MeNB handover with the SeNB unchanged; or, the first node is an SeNB during inter-MeNB handover with the SeNB unchanged, the second node is the S-MeNB during inter-MeNB handover with the SeNB unchanged and the third node is a T-MeNB during inter-MeNB handover with the SeNB unchanged; or, the first node is a T-SeNB in a process of adding an SeNB after handover, the second node is a eNB in the process of adding the SeNB after handover and the third node is a T-MeNB in the process of adding the SeNB after handover; alternatively, the first node is a T-SeNB during inter-MeNB handover together with inter-SeNB handover, the second node is an S-MeNB during inter-MeNB handover together with the inter-SeNB handover and the third node is a T-MeNB during inter-MeNB handover together with the inter-SeNB handover; alternatively, the first node is an S-SeNB during inter-MeNB handover together with the inter-SeNB handover, the second node is the T-MeNB during inter-MeNB handover together with the inter-SeNB handover and the third node is the S-MeNB during inter-MeNB handover together with the inter-SeNB handover.

4. A data transmission method, comprising:
in a condition that a third node is required to acquire whether an X2 interface exists between a first node and a second node, notifying, by the third node, information of the first node to the second node, so as to enable the second node to determine whether the X2 interface exists between the second node and the first node; or notifying, by the third node, information of the second node to the first node, so as to enable the first node to determine whether the X2 interface exists between the first node and the second node;
receiving, by the third node, indication information from the second node or the first node, wherein the indication information is used to indicate that the X2 interface exists between the second node and the first node or the indication information is used to indicate that a direct-forwarding path is available; and
transmitting, by the third node, a forwarding address of the second node to the first node, or transmitting, by the third node, a forwarding address of the first node to the second node;
wherein notifying, by the third node, the information of the second node to the first node comprises: notifying, by the third node, the information of the second node to the first node in a newly defined message or an existing dual connectivity message; and
notifying, by the third node, the information of the first node to the second node comprises: notifying, by the third node, the information of the first node to the second node in a newly defined message or an existing X2 message;
wherein the existing dual connectivity message comprises an SeNB modification request message or an SeNB adding request message; wherein
after notifying, by the third node, the information of the second node to the first node in the SeNB modification request message or the SeNB adding request message or the newly defined message;
the receiving, by the third node, the indication information from the first node comprises: receiving, by the third node, an SeNB modification request confirmation information or an SeNB adding request confirmation message or a newly defined confirmation message from the first node, wherein the SeNB modification request confirmation information or the SeNB adding request confirmation message or the newly defined confirmation message carries the indication information; and the transmitting, by the third node, the forwarding address of the first node to the second node comprises: transmitting, by the third node, the forwarding address of the first node to the second node in an X2 handover request confirmation message.

5. The method according to claim 4, wherein after the transmitting, by the third node, the forwarding address of the first node to the second node, the method further comprises:
after the second node acquires the forwarding address of the first node, performing data forwarding directly from the second node to the first node.

6. The method according to claim 4, wherein the first node is an SeNB during inter-MeNB handover with the SeNB unchanged, the second node is a T-MeNB during inter-MeNB handover with the SeNB unchanged and the third node is a Source MeNB (S-MeNB) during inter-MeNB handover with the SeNB unchanged; or, the first node is an SeNB during inter-MeNB handover with the SeNB unchanged, the second node is the S-MeNB during inter-MeNB handover with the SeNB unchanged and the third node is a T-MeNB during inter-MeNB handover with the SeNB unchanged; or, the first node is a T-SeNB in a process of adding an SeNB after handover, the second node is a eNB in the process of adding the SeNB after handover and the third node is a T-MeNB in the process of adding the SeNB after handover; alternatively, the first node is a T-SeNB during inter-MeNB handover together with inter-SeNB handover, the second node is an S-MeNB during inter-MeNB handover together with the inter-SeNB handover and the third node is a T-MeNB during inter-MeNB handover together with the inter-SeNB handover; alternatively, the first node is an S-SeNB during inter-MeNB handover together with the inter-SeNB handover, the second node is the T-MeNB during inter-MeNB handover together with the inter-SeNB handover and the third node is the S-MeNB during inter-MeNB handover together with the inter-SeNB handover.

7. A data transmission method, comprising:
in a condition that a third node is required to acquire whether an X2 interface exists between a first node and a second node, notifying, by the third node, information of the first node to the second node, so as to enable the second node to determine whether the X2 interface exists between the second node and the first node; or notifying, by the third node, information of the second node to the first node, so as to enable the first node to determine whether the X2 interface exists between the first node and the second node;
receiving, by the third node, indication information from the second node or the first node, wherein the indication information is used to indicate that the X2 interface exists between the second node and the first node or the indication information is used to indicate that a direct-forwarding path is available; and transmitting, by the third node, a forwarding address of the second node to the first node, or transmitting, by the third node, a forwarding address of the first node to the second node;

wherein notifying, by the third node, the information of the second node to the first node comprises: notifying, by the third node, the information of the second node to the first node in a newly defined message or an existing dual connectivity message; and notifying, by the third node, the information of the first node to the second node comprises: notifying, by the third node, the information of the first node to the second node in a newly defined message or an existing X2 message; wherein after notifying, by the third node, the information of the first node to the second node in the newly defined message or the existing X2 message;

the receiving, by the third node, the indication information from the second node comprises: receiving, by the third node, an X2 handover request message from the second node, wherein the X2 handover request message carries the indication information; and the transmitting, by the third node, the forwarding address of the first node to the second node comprises: transmitting, by the third node, the forwarding address of the first node to the second node in an X2 handover request confirmation message.

8. The method according to claim 7, wherein after the transmitting, by the third node, the forwarding address of the first node to the second node, the method further comprises:
after the second node acquires the forwarding address of the first node, performing data forwarding directly from the second node to the first node.

9. The method according to claim 7, wherein the first node is an SeNB during inter-MeNB handover with the SeNB unchanged, the second node is a T-MeNB during inter-MeNB handover with the SeNB unchanged and the third node is a Source MeNB (S-MeNB) during inter-MeNB handover with the SeNB unchanged; or, the first node is an SeNB during inter-MeNB handover with the SeNB unchanged, the second node is the S-MeNB during inter-MeNB handover with the SeNB unchanged and the third node is a T-MeNB during inter-MeNB handover with the SeNB unchanged; or, the first node is a T-SeNB in a process of adding an SeNB after handover, the second node is a eNB in the process of adding the SeNB after handover and the third node is a T-MeNB in the process of adding the SeNB after handover; alternatively, the first node is a T-SeNB during inter-MeNB handover together with inter-SeNB handover, the second node is an S-MeNB during inter-MeNB handover together with the inter-SeNB handover and the third node is a T-MeNB during inter-MeNB handover together with the inter-SeNB handover; alternatively, the first node is an S-SeNB during inter-MeNB handover together with the inter-SeNB handover, the second node is the T-MeNB during inter-MeNB handover together with the inter-SeNB handover and the third node is the S-MeNB during inter-MeNB handover together with the inter-SeNB handover.

* * * * *

UNITED STATES PATENT AND TRADEMARK OFFICE
CERTIFICATE OF CORRECTION

PATENT NO. : 10,595,239 B2  
APPLICATION NO. : 15/563605  
DATED : March 17, 2020  
INVENTOR(S) : Yunlu Wu et al.

Page 1 of 2

It is certified that error appears in the above-identified patent and that said Letters Patent is hereby corrected as shown below:

On the Title Page

Column 2, item (74), Attorney, Lines 1-2, delete "Knobbe, Martens, Olson & Bear" and insert --Knobbe, Martens, Olson & Bear LLP,--.

Page 2, Column 2, item (56), Other Publications, Line 12, delete "050," and insert --C50,--.

Page 2, Column 2, item (56), Other Publications, Line 14, delete "Fance," and insert --France,--.

In the Specification

Column 3, Line 34, delete "SeNB)," and insert --SeNB);--.

Column 3, Line 49, delete "at at" and insert --at--.

Column 3, Line 66, delete "hearer," and insert --bearer,--.

Column 5, Line 42, delete "T-SeNB" and insert --T-SeNB.--.

Column 5, Line 63, delete "sequence" and insert --sequence (i.e.,--.

Column 8, Line 65, delete "Preferably, The" and insert --Preferably, the--.

Column 9, Line 16, delete "Preferably, The" and insert --Preferably, the--.

Column 9, Line 34, delete "Preferably, The" and insert --Preferably, the--.

Column 9, Line 53, delete "Preferably, The" and insert --Preferably, the--.

Column 10, Line 3, delete "Preferably, The" and insert --Preferably, the--.

Signed and Sealed this  
Sixth Day of October, 2020

Andrei Iancu  
*Director of the United States Patent and Trademark Office*

CERTIFICATE OF CORRECTION (continued)
U.S. Pat. No. 10,595,239 B2

Column 10, Line 27, delete "dining" and insert --during--.

Column 11, Line 10, delete "Preferably, The" and insert --Preferably, the--.

Column 11, Line 32, delete "Preferably, The" and insert --Preferably, the--.

Column 24, Line 28, delete "by" and insert --by the--.

Column 24, Line 36, delete "S-MeNB" and insert --S-MeNB,--.

Column 24, Line 39, delete "S-MeNB" and insert --S-MeNB.--.

Column 25, Line 29, delete "Nether" and insert --whether--.

Column 30, Line 20, delete "manners," and insert --manners.--.